(12) United States Patent
Moses et al.

(10) Patent No.: US 12,447,539 B2
(45) Date of Patent: Oct. 21, 2025

(54) MATERIAL GRINDING END EFFECTOR ASSEMBLY, SUBASSEMBLIES THEREOF, AND METHODS FOR UTILIZING THE SAME

(71) Applicant: Edw. C. Levy Co., Detroit, MI (US)

(72) Inventors: Craig Moses, Ladson, SC (US); Edward Thomas, Andrews, SC (US); Alan Langston, Mount Pleasant, SC (US)

(73) Assignee: Edw. C. Levy Co., Detroit, MI (US)

( * ) Notice: Subject to any disclaimer, the term of this patent is extended or adjusted under 35 U.S.C. 154(b) by 775 days.

(21) Appl. No.: 17/661,782

(22) Filed: May 3, 2022

(65) Prior Publication Data

US 2022/0371108 A1  Nov. 24, 2022

Related U.S. Application Data

(60) Provisional application No. 63/191,691, filed on May 21, 2021.

(51) Int. Cl.
*B23C 5/10* (2006.01)
*B23C 5/22* (2006.01)

(52) U.S. Cl.
CPC .............. *B23C 5/109* (2013.01); *B23C 5/226* (2013.01); *B23C 2210/28* (2013.01); *B23C 2210/54* (2013.01)

(58) Field of Classification Search
CPC . B23B 51/04; B23B 51/0411; B23B 51/0413; B23B 51/0426; B23B 51/044; B23B 51/0453; B23B 51/0461; B23B 51/0466; B23B 51/0473; B23B 51/109; B23B 51/107; B23B 51/108; B23B 2251/74; E21B 10/42; E21B 10/485; E21B 10/54; E21B 10/58; E21B 10/26; E12D 9/1006
See application file for complete search history.

(56) References Cited

U.S. PATENT DOCUMENTS

| | | | | |
|---|---|---|---|---|
| 1,554,669 A | * | 9/1925 | Watkins | B23B 5/168 407/45 |
| 2,053,702 A | * | 9/1936 | Davis | B23B 51/0426 408/710 |
| 2,990,896 A | * | 7/1961 | Kandle | E21B 10/327 175/323 |

(Continued)

FOREIGN PATENT DOCUMENTS

| | | | |
|---|---|---|---|
| DE | 2410120 A1 | * | 9/1975 |
| FR | 2594728 A1 | * | 8/1987 |
| WO | WO-2017146569 A1 | * | 8/2017 |

*Primary Examiner* — Nicole N Ramos
(74) *Attorney, Agent, or Firm* — Honigman LLP

(57) ABSTRACT

The present disclosure provides a cutting device. The cutting device includes a shaft, two or more gussets, two or more radial cutting members, and a circumferential cutting member. The shaft extends from a first end to a second end. The two or more gussets include at least a first gusset and a second gusset extending radially away from the shaft. The two or more radial cutting members include at least a first radial cutting member axially supported by the first gusset and a second radial cutting member axially supported by the second gusset. The circumferential cutting member is axially supported by each of the first gusset and the second gusset.

20 Claims, 27 Drawing Sheets

(56) References Cited

U.S. PATENT DOCUMENTS

| | | | | |
|---|---|---|---|---|
| 3,672,785 | A * | 6/1972 | Byrne | B23B 51/10 |
| | | | | 408/206 |
| 3,734,214 | A * | 5/1973 | Benetti | E21B 10/44 |
| | | | | 299/85.2 |
| 6,893,194 | B2 * | 5/2005 | Jones | B23B 51/0426 |
| | | | | 408/206 |
| 7,131,506 | B2 * | 11/2006 | Hamilton | E21B 10/02 |
| | | | | 175/320 |
| 7,384,222 | B2 * | 6/2008 | Chao | B23B 31/11 |
| | | | | 408/206 |
| 7,938,600 | B1 * | 5/2011 | Griep | B23B 51/044 |
| | | | | 408/239 R |
| 9,120,162 | B2 * | 9/2015 | Keightley | B23B 51/0466 |
| 10,835,969 | B1 * | 11/2020 | Scaglione | B23B 51/08 |
| 2008/0181738 | A1 * | 7/2008 | Capriotti | B23B 51/105 |
| | | | | 408/207 |
| 2016/0151841 | A1 * | 6/2016 | Tyczynski | B23B 51/02 |
| | | | | 408/224 |

* cited by examiner

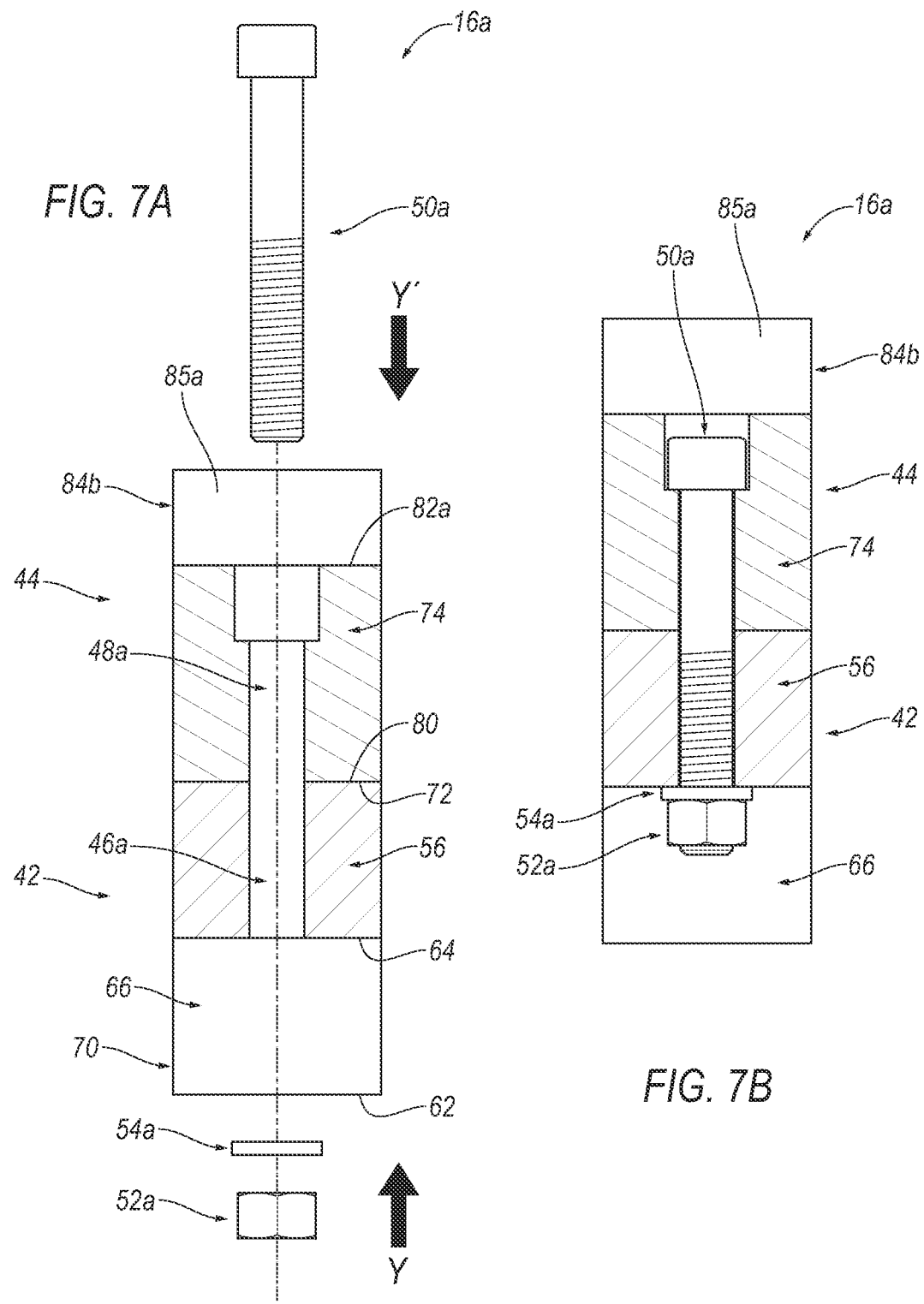

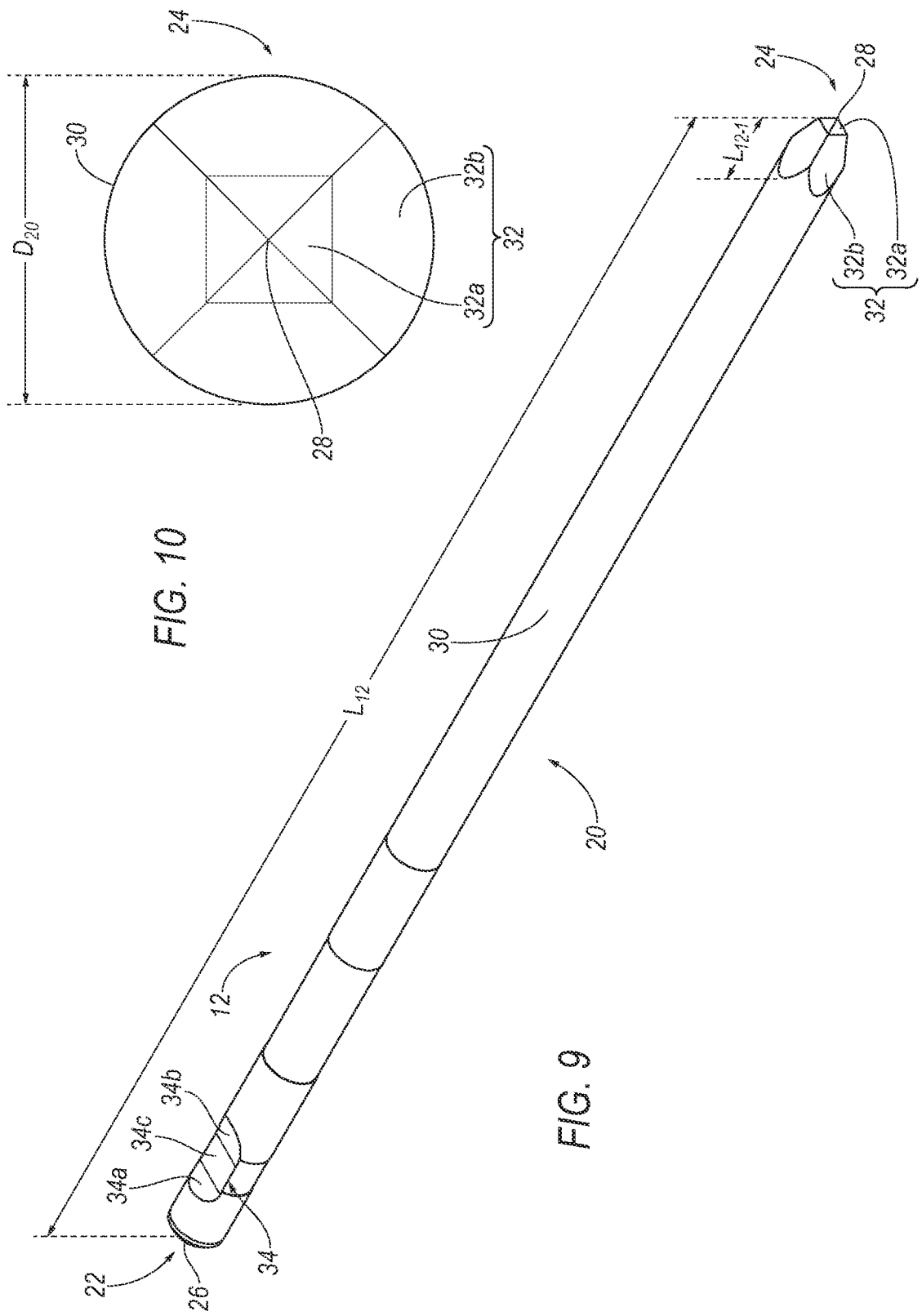

MATERIAL GRINDING END EFFECTOR ASSEMBLY, SUBASSEMBLIES THEREOF, AND METHODS FOR UTILIZING THE SAME

CROSS REFERENCE TO RELATED APPLICATIONS

This application claims priority under 35 U.S.C. § 119(e) to U.S. Provisional Application 63/191,691, filed on May 21, 2021. The disclosure of this prior application is considered part of the disclosure of this application and is hereby incorporated by reference in its entireties.

TECHNICAL FIELD

This disclosure relates to a material grinding end effector assembly, subassemblies thereof, and methods for utilizing the same.

BACKGROUND

End effectors are known and may be utilized in a variety of industries for performing a particular operation. While existing end effectors perform adequately for their intended purpose, improvements to end effectors are continuously being sought in order to advance the arts.

SUMMARY

One aspect of the disclosure provides a cutting device. The cutting device includes: a shaft; two or more gussets; two or more radial cutting members; and a circumferential cutting member. The shaft extends from a first end to a second end. He two or more gussets include at least a first gusset and a second gusset extending radially away from the shaft. The two or more radial cutting members include at least a first radial cutting member axially supported by the first gusset and a second radial cutting member axially supported by the second gusset. The circumferential cutting member is axially supported by each of the first gusset and the second gusset.

Implementations of the disclosure may include one or more of the following optional features. In some implementations, each of the first radial cutting member and the second radial cutting member each include: a radial base element; and a radial cutting element. The radial cutting element is removably-attached to the radial base element. Each radial cutting member further includes at least one fastener, a fastener passage of the radial cutting element, and a fastener passage of the radial base element. The at least one fastener extends through the fastener passage of the radial cutting element and the fastener passage of the radial base element for removably-attaching the radial cutting element to the radial base element.

In some examples, the radial base element of each of the first radial cutting member and the second radial cutting member is fixedly attached to each of the first gusset and the second gusset. The radial cutting element includes one or more teeth each including a radial inwardly-facing surface and a radial outwardly-facing surface that converge to form an apex of each tooth.

In some implementations, the circumferential cutting member includes a circumferential base element and a circumferential cutting element. The circumferential cutting element is removably-attached to the circumferential base element. The circumferential cutting member further includes at least one fastener that extends through a fastener passage of the circumferential base element and a fastener passage of the circumferential cutting element for removably-attaching the circumferential cutting element to the circumferential base element. The circumferential base element may be fixedly attached to each of the first gusset and the second gusset. The circumferential cutting element includes one or more circumferential teeth each including a radially inwardly-facing surface and a radially outwardly-facing surface that converge along an axial direction.

In some examples, the shaft includes a central tooth extending from the second end of the shaft. The central tooth is formed by a surface portion including one or more substantially flat surface portions and one or more fluted surface portions. The one or more substantially flat surface portions include a first substantially flat surface portion and a second substantially flat surface portion that is arranged in an opposing relationship with respect to the first substantially flat surface portion to form a first tooth angle. The one or more fluted surface portions includes a first fluted surface portion and a second fluted surface portion that is arranged in an opposing relationship with respect to the first fluted surface portion to form a second tooth angle. The first tooth angle is greater than the second tooth angle. Furthermore, the shaft may include an arm keying surface portion located near the first end of the shaft.

Another aspect of the disclosure provides a cutting device. The cutting device includes a shaft, two or more gussets, a circumferential cutting member, and a plurality of radial cutting members. The two or more gussets extend radially away from the shaft, each gusset defining a support surface. The circumferential cutting member includes a series of circumferential teeth surrounding the shaft and removably attached to each of the support surfaces of the two or more gussets. The plurality of radial cutting members each include a series of radial teeth removably attached to one of the support surfaces between the shaft to the circumferential cutting member.

This aspect may include one or more of the following optional features. In some examples, each of the plurality of radial cutting members includes a radial base element and a radial cutting element. The radial cutting element includes the series of radial teeth removably-attached to the radial base element. Each radial cutting member further includes at least one fastener that extends through a fastener passage of the radial cutting element and a fastener passage of the radial base element for removably-attaching the radial cutting element to the radial base element. The radial base element is fixedly attached to each gusset of the two or more gussets. The circumferential cutting member includes a circumferential base element and a circumferential cutting element. The circumferential cutting element includes the circumferential teeth removably-attached to the circumferential base element.

In some implementations, the circumferential cutting member further includes at least one fastener that extends through a fastener passage of the circumferential base element and a fastener passage of the circumferential cutting element for removably-attaching the circumferential cutting element to the circumferential base element. The circumferential base element is fixedly attached to the support surface of each gusset of the two or more gussets.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7A is an exploded cross-sectional view of the cutting device referenced from line 7-7 of FIG. 4.

FIG. 7B is an assembled cross-sectional view of the cutting device according to line 7-7 of FIG. 4.

FIG. 9 is a perspective view of a shaft of the cutting device of FIG. 1.

FIG. 10 is a top view of the shaft of FIG. 9.

Like reference symbols in the various drawings indicate like elements.

DETAILED DESCRIPTION

Figure 16A:
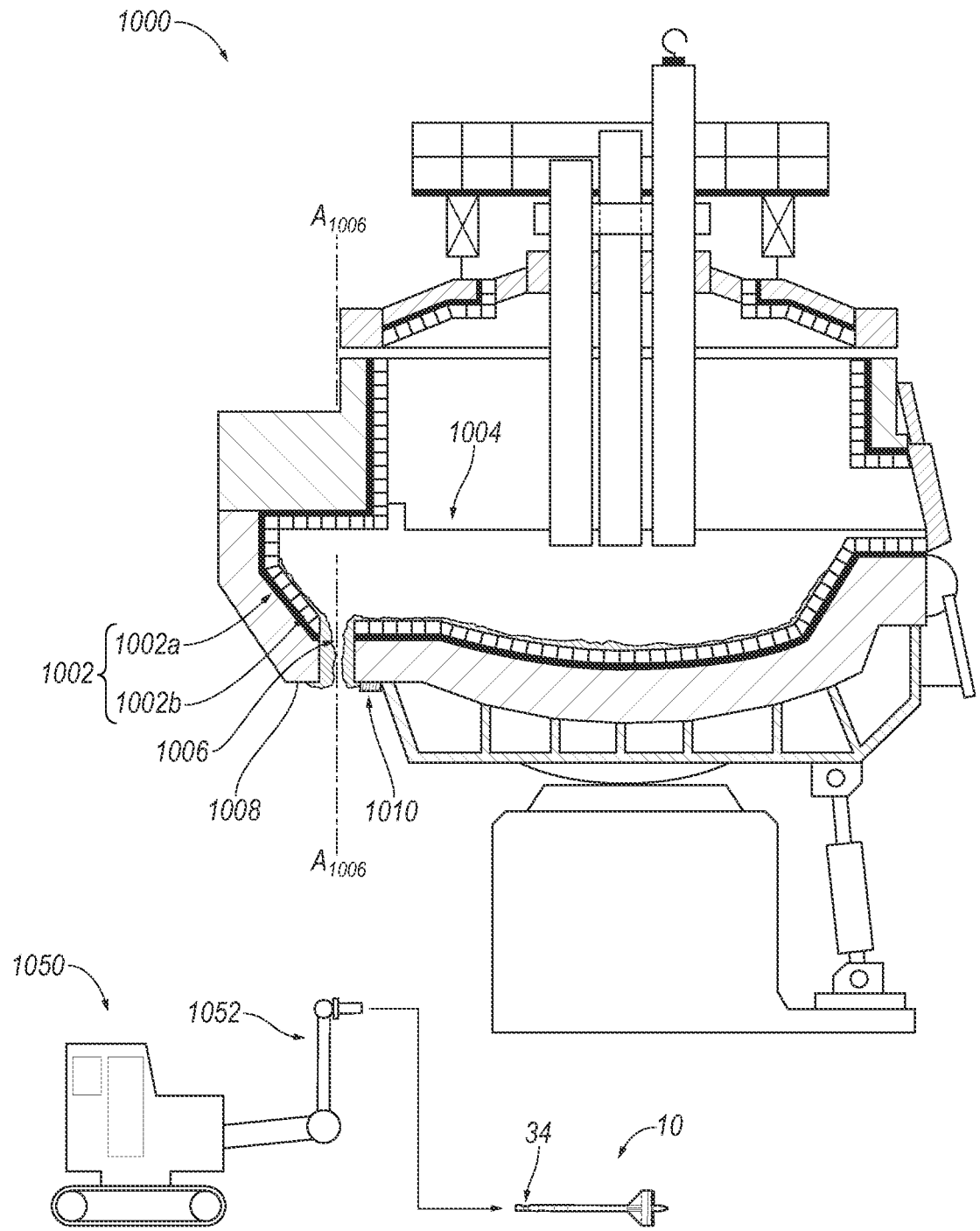
FIG. 16A is a side view of the cutting device of FIG. 1 that is not attached to a moving device that is arranged near a material processing device that includes a taphole.
Figure 16B:
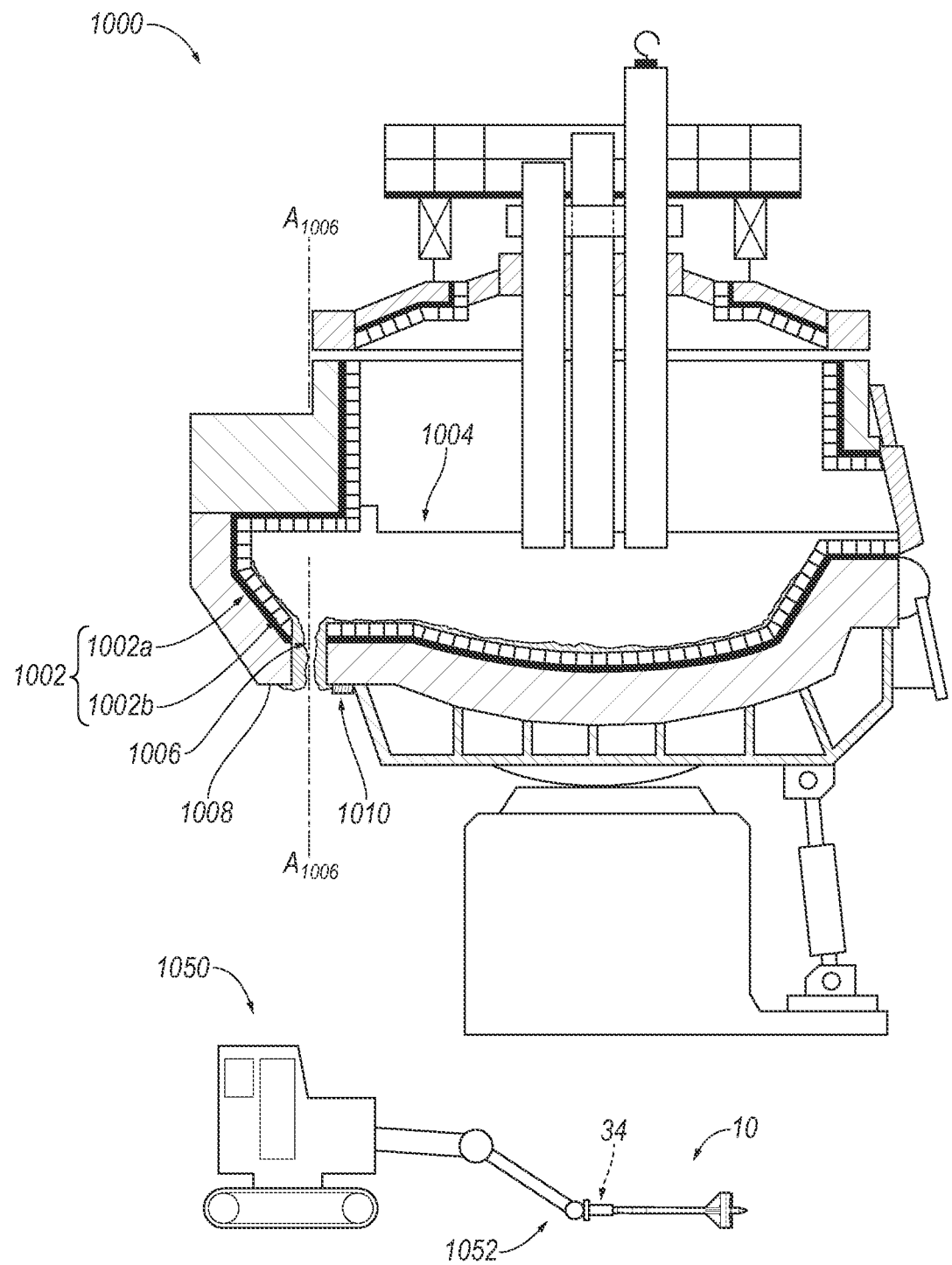
FIG. 16B is a side view of the cutting device of FIG. 16A attached to the moving device that is still arranged near the material processing device.
Figure 16C:
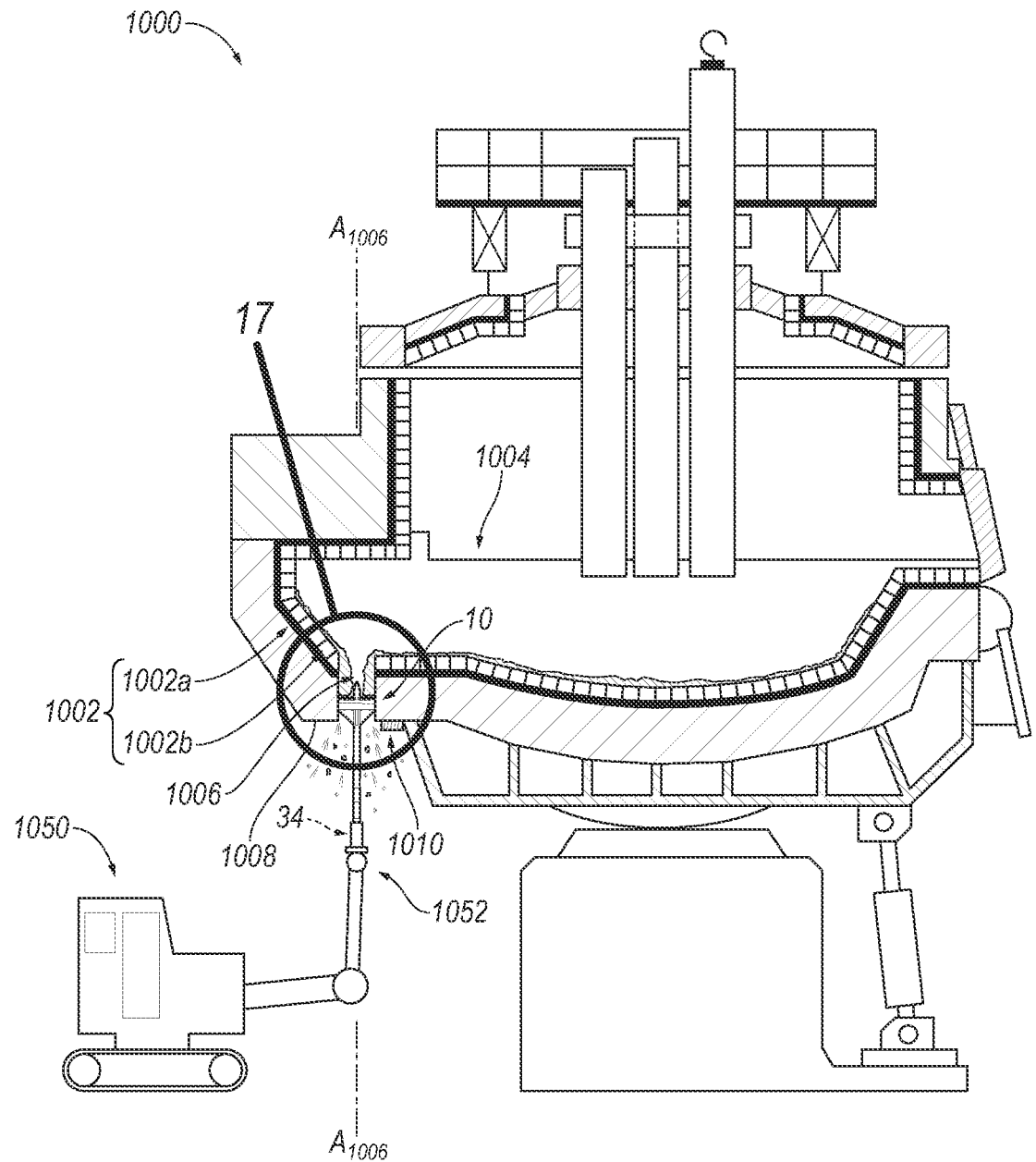
FIG. 16C is a side view of the moving device arranging the cutting device within the taphole of the material processing device.

A raw material, such as, for example, steel, may be processed by a material processing device, such as, for example, an electrode arc furnace, which is seen generally at 1000 in FIGS. 16A-16C. EAFs 1000 may include a liner 1002 that may include, for example, a fused-grain alumina liner 1002a and alumina-magnesium-carbon liner bricks 1002b that form a cavity 1004 of the EAF 1000.

A plurality of steel portions, which may include one or more of, for example, scrap metal or other iron units such as, for example, direct-reduced iron or the like, may be deposited into the cavity 1004. Once deposited into the cavity 1004, the plurality of steel portions may be heated by one or more components of the EAF 1000 in order to melt the plurality of steel portions such that the steel material transitions from a substantially solid state to a substantially liquid state that at least partially fills a portion of the cavity 1004. The liquid steel may be axially evacuated by way of gravity along a central axis $A_{1006}$-$A_{1006}$ that extends through a taphole 1006 formed in a bottom body portion 1008 of the EAF 1000. Evacuation of the liquid steel may occur after transitioning a stopper gate 1010 from a closed orientation to an open orientation. Once stopper gate 1010 is arranged in the open orientation, the liquid steel may be axial evacuated by way of gravity along the central axis $A_{1006}$-$A_{1006}$ through the taphole 1006 and into an EAF ladle.

Figure 17A:
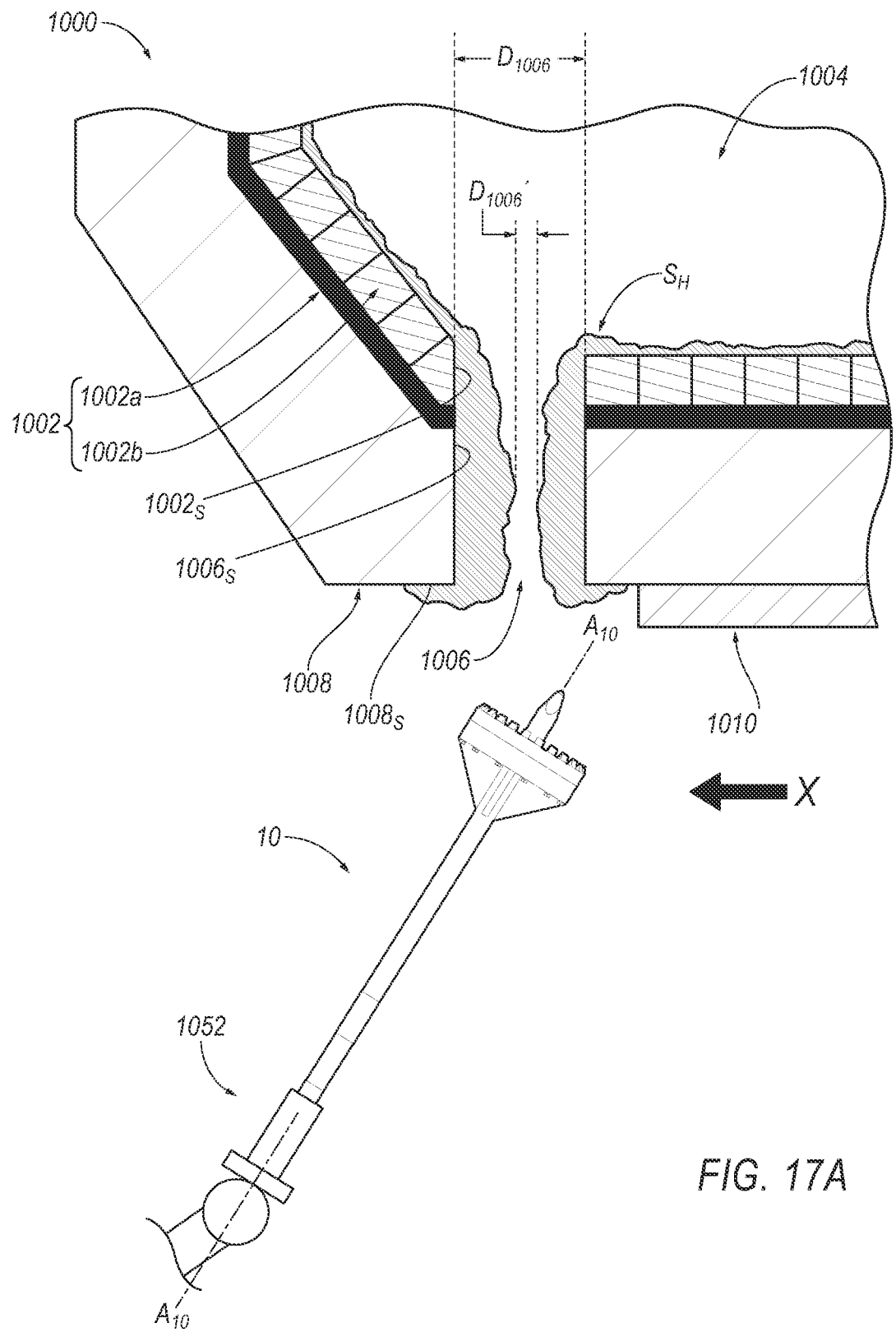
FIG. 17A is an enlarged view according to line 17 of FIG. 16C whereby a portion of the moving device is shown arranging the cutting device near but not within the taphole of the material processing device.

Referring to FIG. 17A, after the liquid steel is evacuated through the taphole 1006 a portion of the melted and hot liquid steel may coat one or more surface portions $1002_S$, $1006_S$, $1008_S$ of the EAF 1000. The coating of melted and hot liquid steel may subsequently cool, thereby forming a hardened steel residue, which is seen generally at $S_H$ in FIGS. 16A-16C and 17A-17F that is arranged over and upon the one or more surface portions $1002_S$, $1006_S$, $1008_S$ of the EAF 1000. The one or more surface portions $1002_S$, $1006_S$, $1008_S$ of the EAF 1000 may include, for example: at least a portion of a surface $1002_S$ of the liner 1002; at least a portion of a surface $1008_S$ of the bottom body portion 1008 of the EAF 1000; and at least a portion of a surface $1006_S$ of the taphole 1006. While the hardened steel residue $S_H$ arranged upon the surface $1002_S$ of the liner 1002 is arranged within the cavity 1004 of the EAF 1000 and may be re-melted in a subsequent material processing operation of the EAF 1000, the hardened steel residue $S_H$ that is arranged upon one or both of the surface $1006_S$ of the taphole 1006 and the surface $1008_S$ of the bottom body portion 1008 of the EAF 1000 is not substantially exposed to the cavity 1004 of the EAF 1000, and, as such, may not be sufficiently re-melted during a subsequent material processing operation of the EAF 1000, thereby at least partially obstructing or clogging the taphole 1006 as seen at FIG. 17A.

Accordingly, in some instances, when the hardened steel residue $S_H$ may undesirably at least partially obstruct or clog the taphole 1006, a maximum geometric potential, which may result in an impeded or blocked flow of the liquid steel in a subsequent material processing operation of the EAF 1000 when the stopper gate 1010 is arranged in an open orientation. In some configurations, the maximum geometric potential $D_{1006}$ of the taphole 1006 may range from about sixteen inches to about twenty-two inches. In other configurations, the maximum geometric potential $D_{1006}$ of the taphole 1006 may be approximately nineteen inches. In other examples, the hardened steel residue $S_H$ may impede or prevent movement of the stopper gate 1010 thereby potentially preventing the stopper gate 1010 from being arranged in a closed orientation, and, as a result, may undesirably permit liquid steel to be prematurely or uncontrollably evacuated from the taphole 1006 in the event that the taphole 1006 is not entirely obstructed or clogged by the hardened steel residue $S_H$.

As seen at FIGS. 16A-16C and 17A-17F, an assembly 10 may be utilized for performing a maintenance operation on the taphole 1006 in order to remove, for example, the obstruction defined by, for example, the hardened steel residue $S_H$. The maintenance operation resulting in the removal of the hardened steel residue $S_H$ may include drilling and/or grinding the hardened steel residue $S_H$ that is located at least within, near, or proximate the taphole 1006. The drilling and/or grinding function provided from the assembly 10 will result in a breaking and/or a subsequent reduction in size of the hardened steel residue $S_H$ that is located at least within, near, or proximate the taphole 1006.

Furthermore, with reference to FIGS. 16A-16C, a portion of the assembly 10 may provide a connection surface or a keying surface that permits the assembly 10 to mate with or be selectively removably connected to a moving device, which is seen generally at 1050. In some configurations, the moving device 1050 may be a vehicle that is movably-supported by tires, a looped track, or the like. In other examples, the moving device 1050 may be a mobile robot. In yet other examples, the moving device 1050 may be a robotic arm that is spatially fixed in place.

Regardless of the configuration of the moving device 1050, the moving device 1050 may include an arm portion 1052 that is sized for permitting removable attachment of the assembly 10 to the moving device 1050. Accordingly, the assembly 10 may form or provide an end effector of the arm portion 1052 of the moving device 1050. Therefore, the assembly 10 may be alternatively referred to as a "material grinding end effector assembly" or a "taphole material obstruction removal end effector assembly".

Referring to FIGS. 1-6, a plurality of views of the cutting device 10 are shown. In some configurations, the cutting device 10 may be sized for servicing or providing maintenance on a portion of an EAF, such as, for example, the exemplary taphole 1006 of the exemplary EAF 1000 as seen at FIGS. 16A-16C and 17A-17F. Although the cutting device 10 is sized and configured for servicing or performing maintenance on a taphole of an EAF, the cutting device 10 may be sized and configured to perform other operations in other environments, and, as such, is not limited to the intended use shown and described in the present disclosure.

Figure 1:
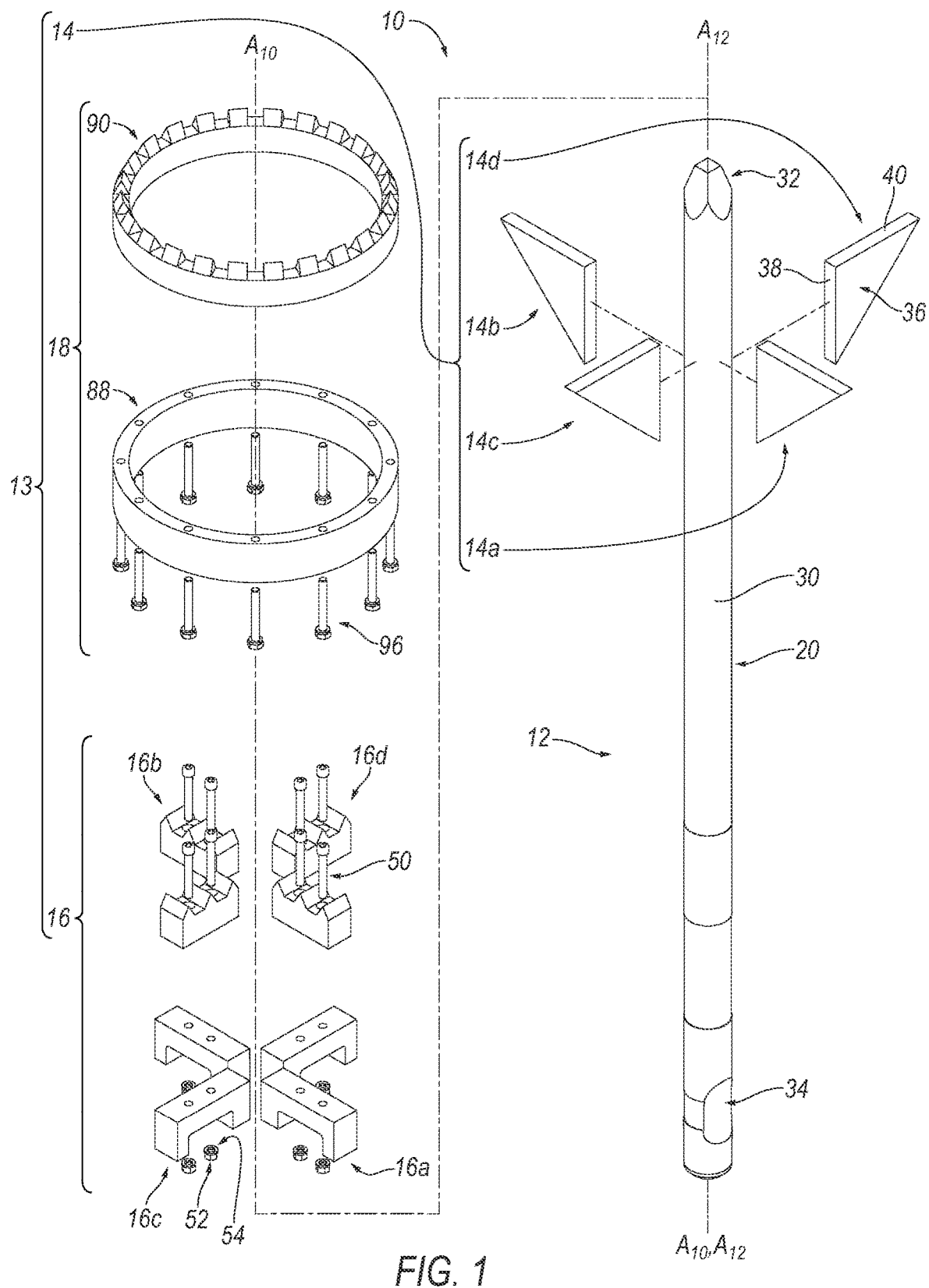
FIG. 1 is an exploded side perspective view of a material grinding end effector assembly.
Figure 2:
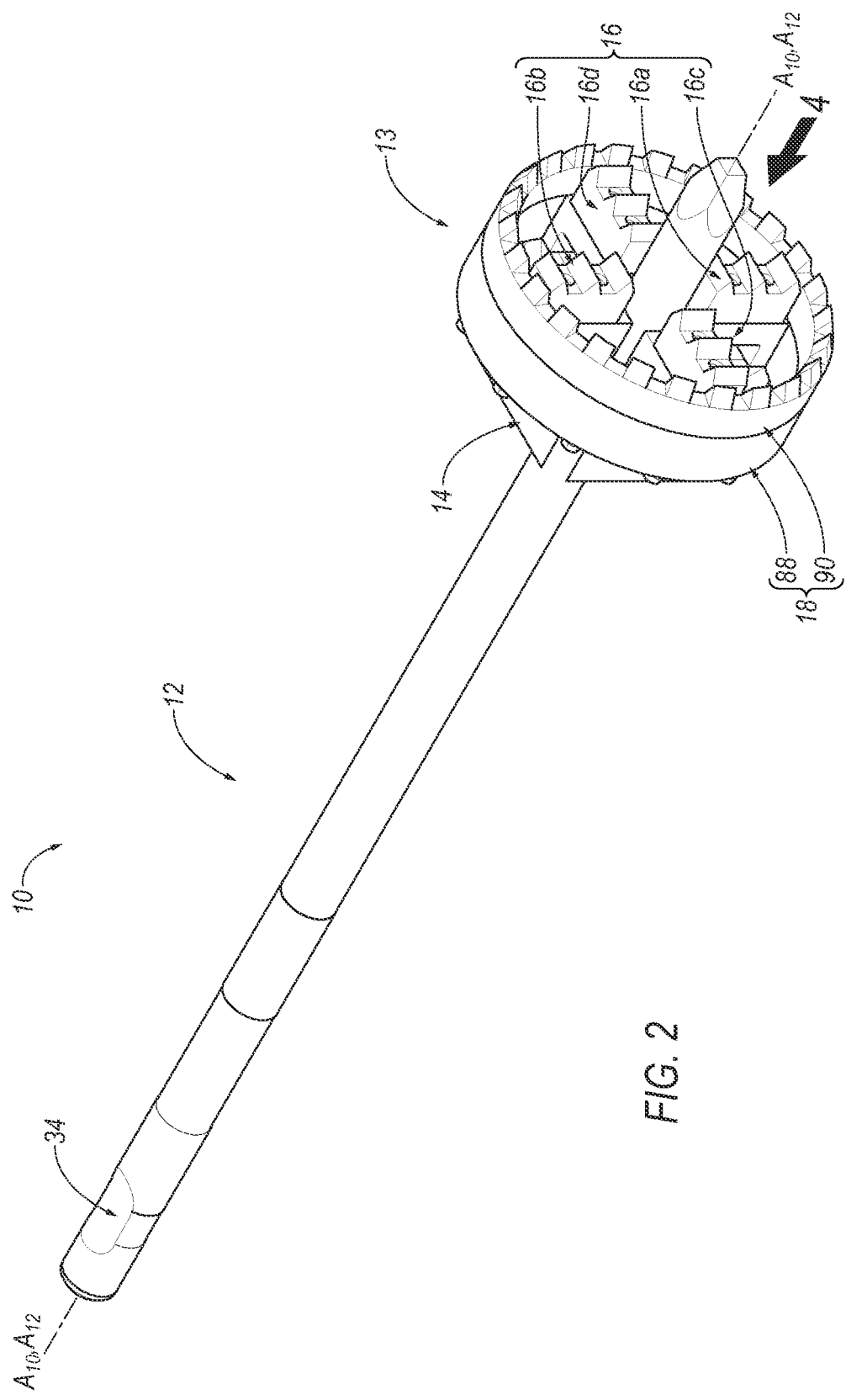
FIG. 2 is an assembled front perspective view of the cutting device of FIG. 1.

As seen at FIG. 1, the cutting device 10 may include an axial member or shaft 12 and a head portion 13. The head portion 13 includes one or more radial members or gussets 14; one or more toothed radial subassemblies or one or more radial cutting members 16; and a toothed circumferential subassembly or a circumferential cutting member 18. A central axis $A_{10}$-$A_{10}$ of the cutting device 10 is coincidentally aligned with a central axis $A_{12}$-$A_{12}$ of the shaft 12. One or both of the shaft portion 12 and the head portion 13 may be formed from a hardened steel alloy material.

The one or more gussets 14 are connected directly to and extend substantially radially from the shaft 12. At least one of the one or more radial cutting members 16 and the circumferential cutting member 18 may be axially supported by and axially connected directly to the one or more gussets 14.

Figure 11:
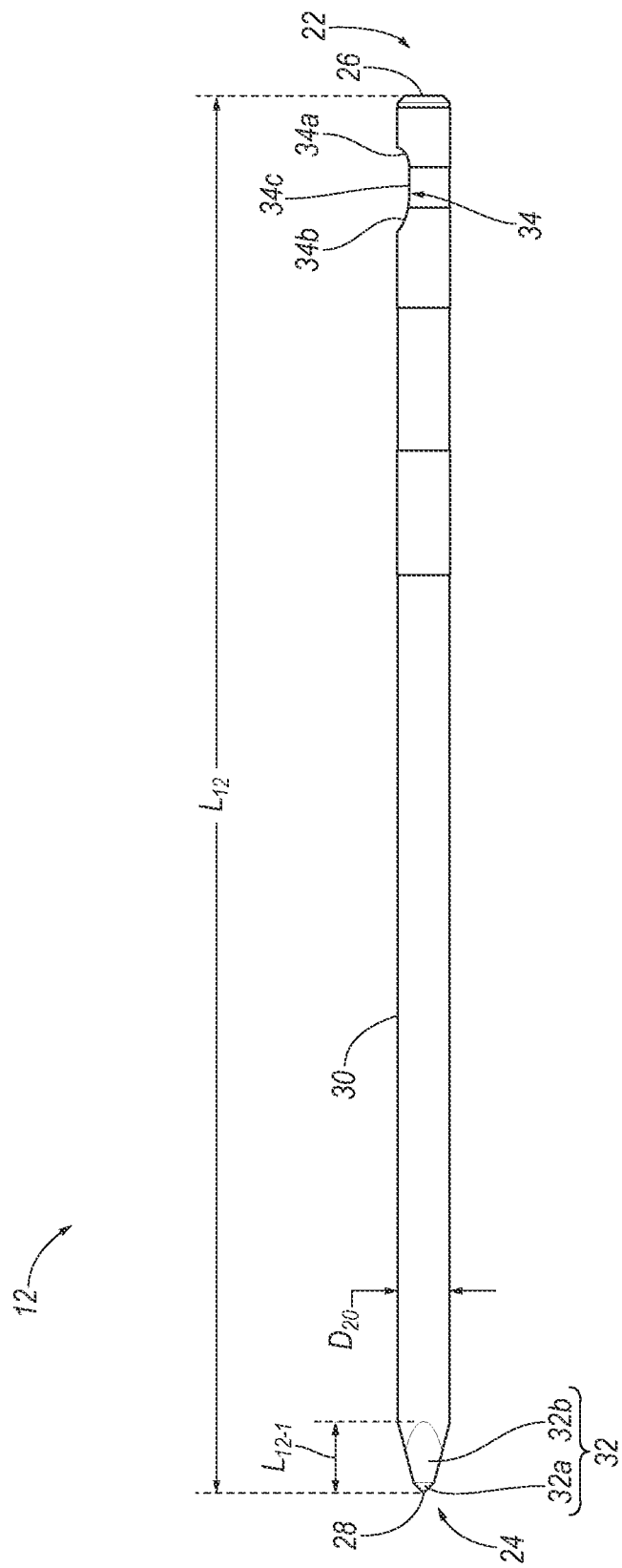
FIG. 11 is a side view of the shaft of FIG. 9.

Referring to FIGS. 9-11, the shaft 12 may include a body 20 having a first end 22 and a second end 24. The first end 22 includes a proximal surface 26. The second end 24 includes a distal surface, which may be alternatively referred to as a distal tip 28. The shaft 12 may include a length $L_{12}$ extending between the proximal surface 26 and the distal tip 28. In some configurations, the length $L_{12}$ of the shaft 12 may be range from about sixty-four inches to about eighty-eight inches.

The body 20 of the shaft 12 also includes an outer side surface 30 that extends between and connects the proximal surface 26 to the distal tip 28. The outer side surface 30 defines the body 20 of the shaft 12 to have a diameter $D_{20}$ for most of the length $L_{12}$ of the shaft 12.

Although the outer side surface 30 defines the body 20 of the shaft 12 to have the diameter $D_{20}$ for most of the length $L_{12}$ of the shaft 12, the outer side surface 30 may define the body 20 to include other surface portions such as, for example, a first outer side surface portion 32 and a second outer side surface portion 34 that are not defined by the diameter $D_{20}$. As seen at FIGS. 9-11, the first outer side surface portion 32 may be located proximate, near, or extend from the second end 24 of the shaft 12, and the second outer side surface portion 34 may be located proximate, near, or extend from the first end 22 of the shaft 12.

The first outer side surface portion 32 extends from the distal tip 28 along a first portion $L_{12\text{-}1}$ of the length $L_{12}$ of the shaft 12. As seen at FIG. 11, the first outer side surface portion 32 progressively decreases in size from the diameter $D_{20}$ to zero at the distal tip 28 as the first outer side surface portion 32 extends along the first portion $L_{12\text{-}1}$ of the length $L_{12}$ of the shaft 12 in a direction from the first end 22 of the shaft 12 to the second end 24 of the shaft 12.

In some implementations, the first outer side surface portion 32 may include, for example: one or more substantially flat surface portions 32a; and one or more fluted surface portions 32b. In some configurations, the one or more fluted surface portions 32b may alternatively be shaped to configured to include substantially flat surface portions, but, arranged at, for example, a different angle with respect to the one or more substantially flat surface portions 32a.

The one or more substantially flat surface portions 32a extend from the distal tip 28 toward the first end 22 of the shaft 12. Functionally, as seen at FIGS. 17A-17F, the first outer side surface portion 32 may define a central tooth of the shaft 12 that provides a material deforming surface portion of the shaft 12 or a material drilling and/or grinding surface portion of the shaft 12 that breaks, disrupts, destroys, or reduces in size the hardened steel residue $S_H$ that may obstruct or clog the taphole 1006. Furthermore, the first outer side surface portion 32 may be sized to be approximately the same as but slightly less than or slightly greater than a geometry in order to axially center shaft 12 along the central axis $A_{1006}$-$A_{1006}$ extending through the taphole 1006, and, as a result, axially center the cutting device 10 along the central axis $A_{1006}$-$A_{1006}$ extending through the taphole 1006.

With reference to FIG. 10, in some examples, the one or more flat surface portions 32a may include, for example, a triangular shape. In some instances, the one or more flat surface portions 32a may be defined by four triangular shape flat surface portions 32a that cooperate to form a four-sided pyramid shape.

The one or more fluted surface portions 32b extend from the one or more substantially flat surface portions 32a toward the first end 22 of the shaft 12. The term "fluted" may define or be alternatively substituted for one or a combination of the terms: concave; curved; and non-flat. In some examples, the one or more fluted surface portions 32b may be defined by four fluted surface portions. In some implementations, a fluted surface portion 32b of the four fluted surface portions respectively extends in a direction toward the first end 22 of the shaft 12 from a corresponding triangular shape flat surface portion of the four triangular shape flat surface portions 32a.

Figure 6:
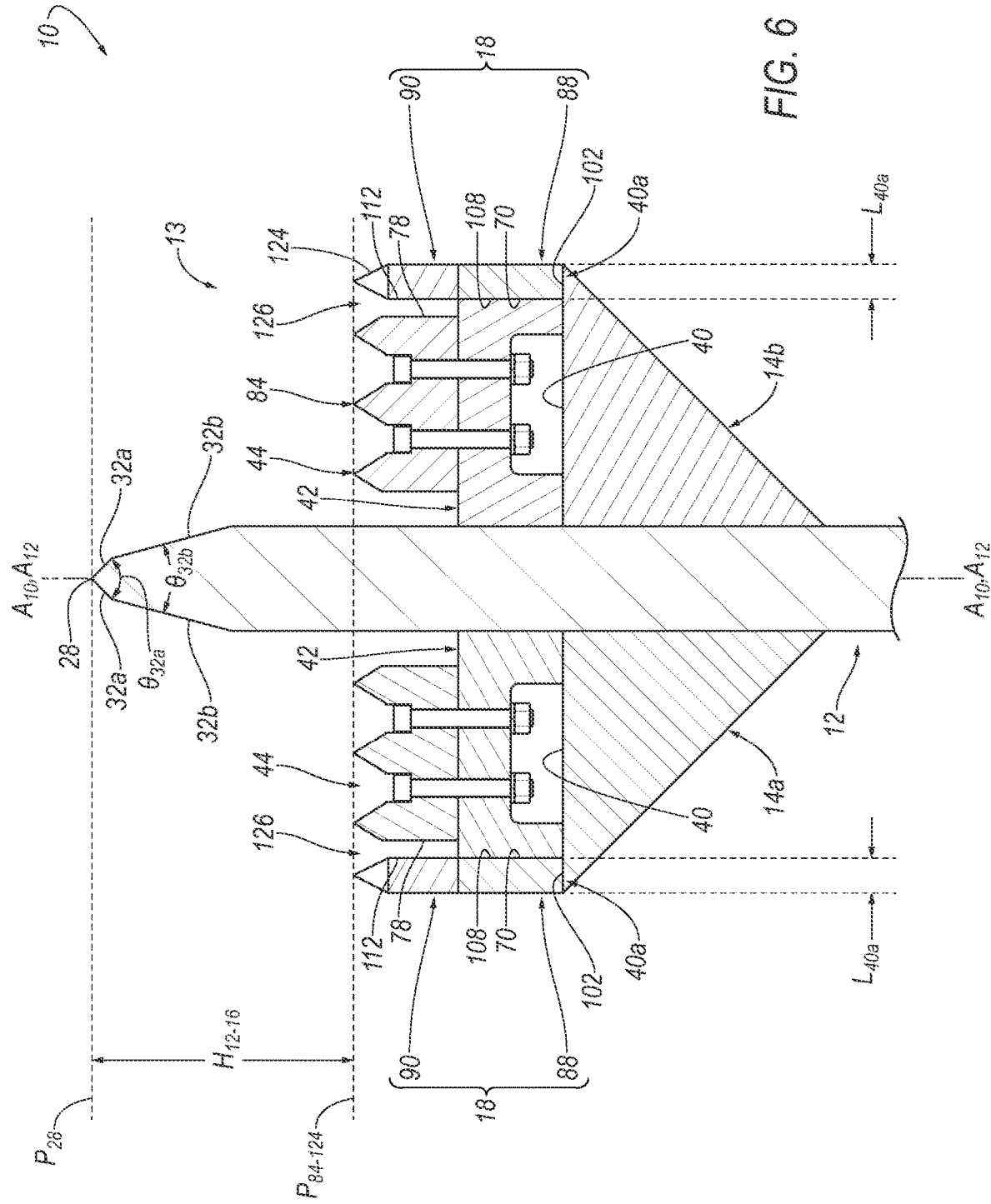
FIG. 6 is a partial cross-sectional view of the cutting device according to line 6-6 of FIG. 3.

Referring to FIG. 6, the first outer side surface portion 32 that defines the central tooth of the shaft 12 may be defined by a first tooth angle $\theta_{32a}$ and a second tooth angle $\theta_{32b}$. Opposing substantially flat surface portions 32a of the first outer side surface portion 32 of the body 20 defines the first tooth angle $\theta_{32a}$, and opposing fluted or substantially flat surface portions 32b of the first outer side surface portion 32 of the body 20 defines the second tooth angle $\theta_{32b}$. As seen at FIG. 6, the first tooth angle $\theta_{32a}$ may be greater than the second tooth angle $\theta_{32b}$.

With reference to FIGS. 9 and 11, in some examples, the second outer side surface portion 34 may include a proximal surface portion 34a, a distal surface portion 34b, and an intermediate surface portion 34c that connects the proximal surface portion 34a to the distal surface portion 34b. Functionally, with reference to FIGS. 16A-16B, the second outer side surface portion 34 may provide a connection surface or a keying surface that permits the shaft 12 to mate with or be selectively removably connected to the arm portion 1052 of the moving device 1050. As will be explained in the following disclosure, the arm portion 1052 may impart movement to the shaft 12, and, as a result, corresponding movement to the cutting device 10.

Figure 3:
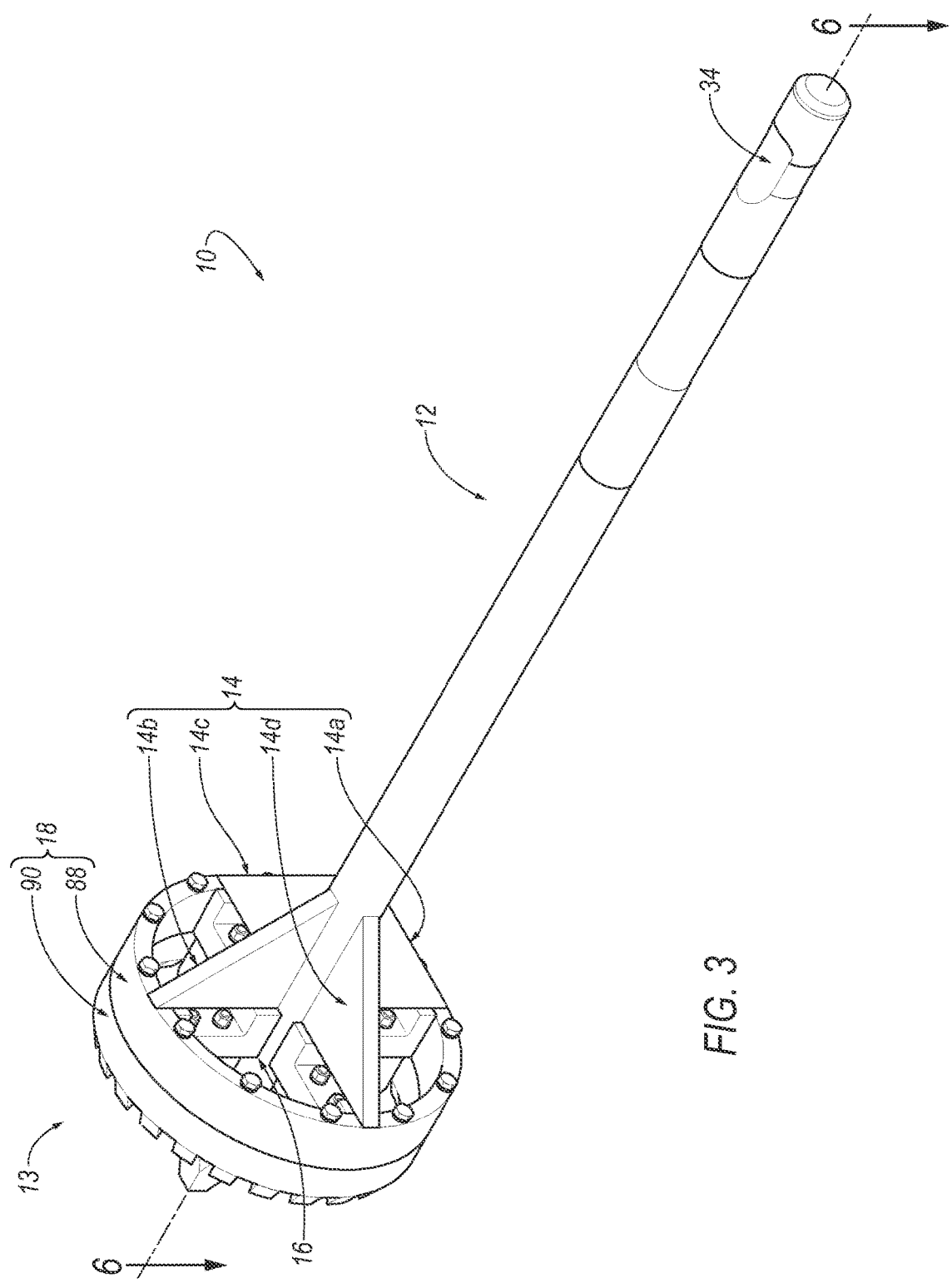
FIG. 3 is an assembled rear perspective view of the cutting device of FIG. 1.
Figure 4:
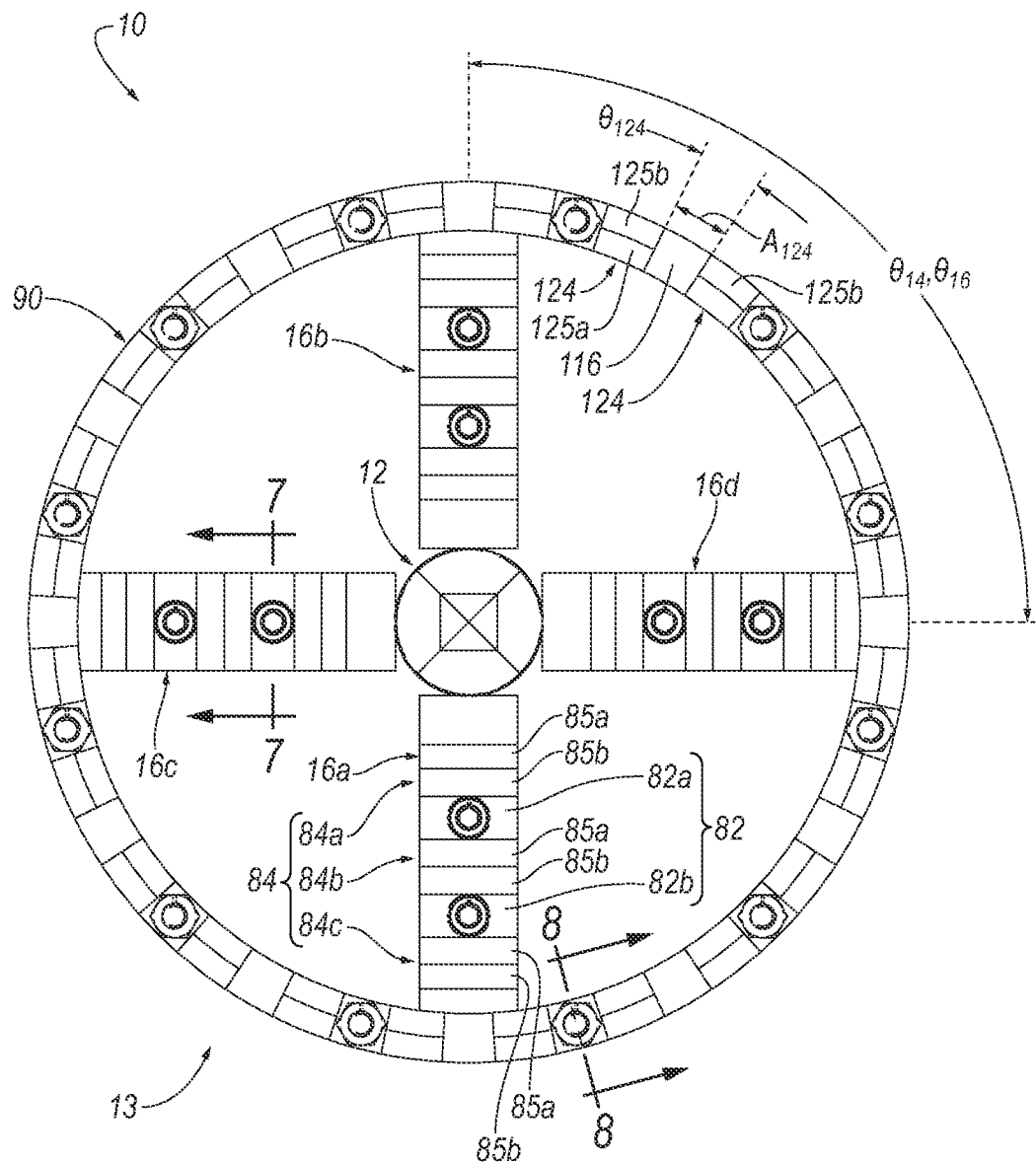
FIG. 4 is a top view of the cutting device according to arrow 4 of FIG. 2.
Figure 5:
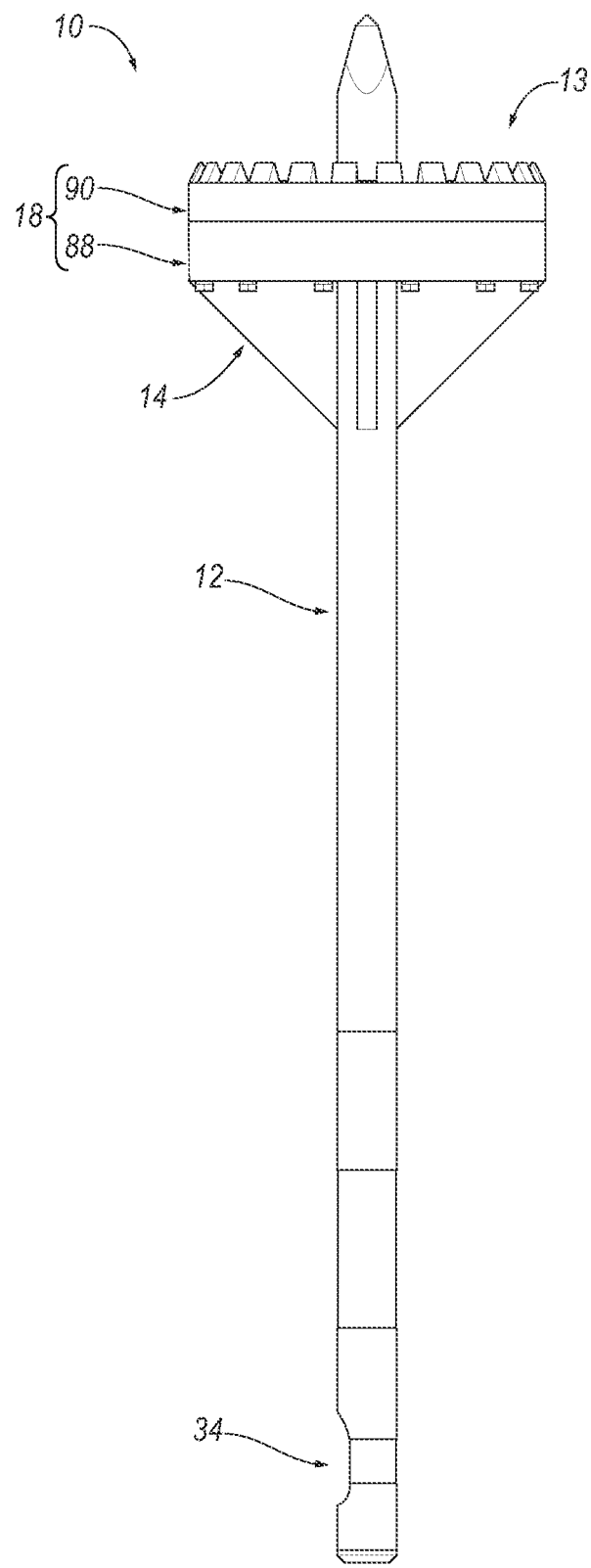
FIG. 5 is a side view of the cutting device of FIG. 1.

With reference to FIGS. 1 and 3, the one or more gussets 14 may be defined by, for example, four gussets including a first gusset 14a, a second gusset 14b, a third gusset 14c, and a fourth gusset 14d. With reference to FIG. 4, the four gussets 14a-14d may substantially radially extend from the shaft 12 and be angularly spaced apart from one another at an angle $\theta_{14}$. The angle $\theta_{14}$ may be equal to 90°. Although four gussets 14a-14d may be included in the exemplary design of the cutting device 10 at FIGS. 1-6, other implementations of the cutting device 10 may include, for example two gussets 14a, 14b defined by, for example the first gusset 14a and the second gusset 14b; in such configurations, the first gusset 14a and the second gusset 14b may radially extend from opposite sides of the shaft 12, and, as such, the angle $\theta_{14}$ may be equal to 180°.

As seen at FIG. 1, each gusset 14a, 14b, 14c, 14d of the one or more gussets 14 may include, for example, a triangular shaped body 36. With reference to the central axis $A_{12}$-$A_{12}$ of the shaft 12, the triangular shaped body 36 may include, for example, an axially-extending surface 38 and radially-extending surface 40.

The axially-extending surface 38 of each gusset 14a, 14b, 14c, 14d of the one or more gussets 14 may be attached to a portion of the outer side surface 30 may define the body 20 of the shaft 12. Furthermore, each gusset 14a, 14b, 14c, 14d of the one or more gussets 14 may be arranged proximate or near but axially distanced from, for example, the first outer side surface portion 32 of the outer side surface 30 of the body 20 of the shaft 12. The radially-extending surface 40 of each gusset 14a, 14b, 14c, 14d of the one or more gussets 14 includes a radially-extending length $L_{40}$ and a width $W_{40}$. The radially-extending length $L_{40}$ and the width $W_{40}$ of the radially-extending surface 40 of each gusset 14a, 14b, 14c, 14d of the one or more gussets 14 are configured in a manner to permit the radially-extending surface 40 of each gusset 14a, 14b, 14c, 14d of the one or more gussets 14 to directly axially support at least a portion of the one or more radial cutting members 16 and at least a portion of a lower surface of a portion of the circumferential cutting member 18.

Referring to FIGS. 12A-12B and 13A-13B, an exemplary configuration of an exemplary of a first radial cutting member 16a of the one or more radial cutting members 16 is shown. The first radial cutting member 16a is also seen at FIG. 1. The components and structural configuration of the first radial cutting member 16a is similar to each of: a second radial cutting member; a third radial cutting member; and a fourth radial cutting member that are seen, respectively, at 16b, 16c, 16c, and 16d.

As seen at FIGS. 3, 4, and 7A-7B, the four radial cutting members 16a-16d of the one or more radial cutting members 16 are axially supported by the four gussets 14a-14d, and, as such, like the four gussets 14a-14d, the four radial cutting members 16a-16d may also be substantially radially arranged relative the shaft 12 and be angularly spaced apart from one another at an angle $\theta_{16}$. The angle $\theta_{16}$ may be equal to 90°. Although four radial cutting members 16a-16d of the one or more radial cutting members 16 may be included in the exemplary design of the cutting device 10 at FIGS. 1-6, other implementations of the cutting device 10 may include, for example two radial cutting members 16a, 16b defined by, for example the first radial cutting member 16a and the second radial cutting member 16b; in such configurations, the first toothed cutting member 16a and the second radial cutting member 16b may be radially arranged relative opposite sides of the shaft 12, and, as such, the angle $\theta_{16}$ may be equal to 180°.

With reference to FIGS. 7A-7B, 12A-12B, and 13A-13B, the first radial cutting member 16a includes a radial base element 42 and a radial cutting element 44. The radial base element 42 may form one or more fastener-receiving passages 46, and the radial cutting element 44 may form one or more fastener-receiving passages 48.

The first radial cutting member 16a may also optionally include: one or more fasteners 50; one or more nuts 52; and one or more washers 54. The one or more fastener-receiving passages 46, 48 are sized for receiving the one or more fasteners 50 for removably-connecting the radial base element 42 to the radial cutting element 44. The one or more nuts 52 and the one or more washers 54 may selectively-retain the one or more fasteners 50 within the one or more fastener-receiving passages 46, 48 formed by, respectively, the radial base element 42 and the radial cutting element 44. The one or more fasteners 50 may be threaded fasteners, bolts, or the like; furthermore, one or more fastener-receiving passages 46, 48 may include a cooperating surface, such as, for example, a threaded surface for threadably-receiving a threaded surface of the one or more fasteners 50.

The one or more fastener-receiving passages 46 of the radial base element 42 includes a first fastener-receiving passage 46a and a second fastener-receiving passage 46b. The one or more fastener-receiving passages 48 of the radial cutting element 44 includes a first fastener-receiving passage 48a and a second fastener-receiving passage 48b.

As seen at FIGS. 7A-7B, 12A-12B, and 13A-13B, the first fastener-receiving passage 46a of the radial base element 42 is axially aligned with the first fastener-receiving passage 48a of the radial cutting element 44 and are configured for receiving a first fastener 50a of the one or more fasteners 50. A first nut 52a of the one or more nuts 52 and a first washer 54a of the one or more washers 54 selectively-retains the first fastener 50a within the first fastener-receiving passage 46a of the radial base element 42 that is axially aligned with the first fastener-receiving passage 48a of the radial cutting element 44.

As seen at FIGS. 12A-12B and 13A-13B, the second fastener-receiving passage 46b of the radial base element 42 is axially aligned with the second fastener-receiving passage 48b of the radial cutting element 44 and are configured for receiving a second fastener 50b of the one or more fasteners 50. A second nut 52b of the one or more nuts 52 and a second washer 54b of the one or more washers 54 selectively-retains the second fastener 50b within the second fastener-receiving passage 46b of the radial base element 42 that is axially aligned with the second fastener-receiving passage 48b of the radial cutting element 44.

Although the radial base element 42 is shown separately formed from the radial cutting element 44, in other configurations, the radial base element 42 and the radial cutting element 44 may be integrally formed as one component. Accordingly, in such an exemplary configuration, the first radial cutting member 16a may not include the one or more fasteners 50, the one or more nuts 52, and the one or more washers 54; as such, the one or more fasteners 50, the one or more nuts 52, and the one or more washers 54 may be optional components.

Figure 12A:
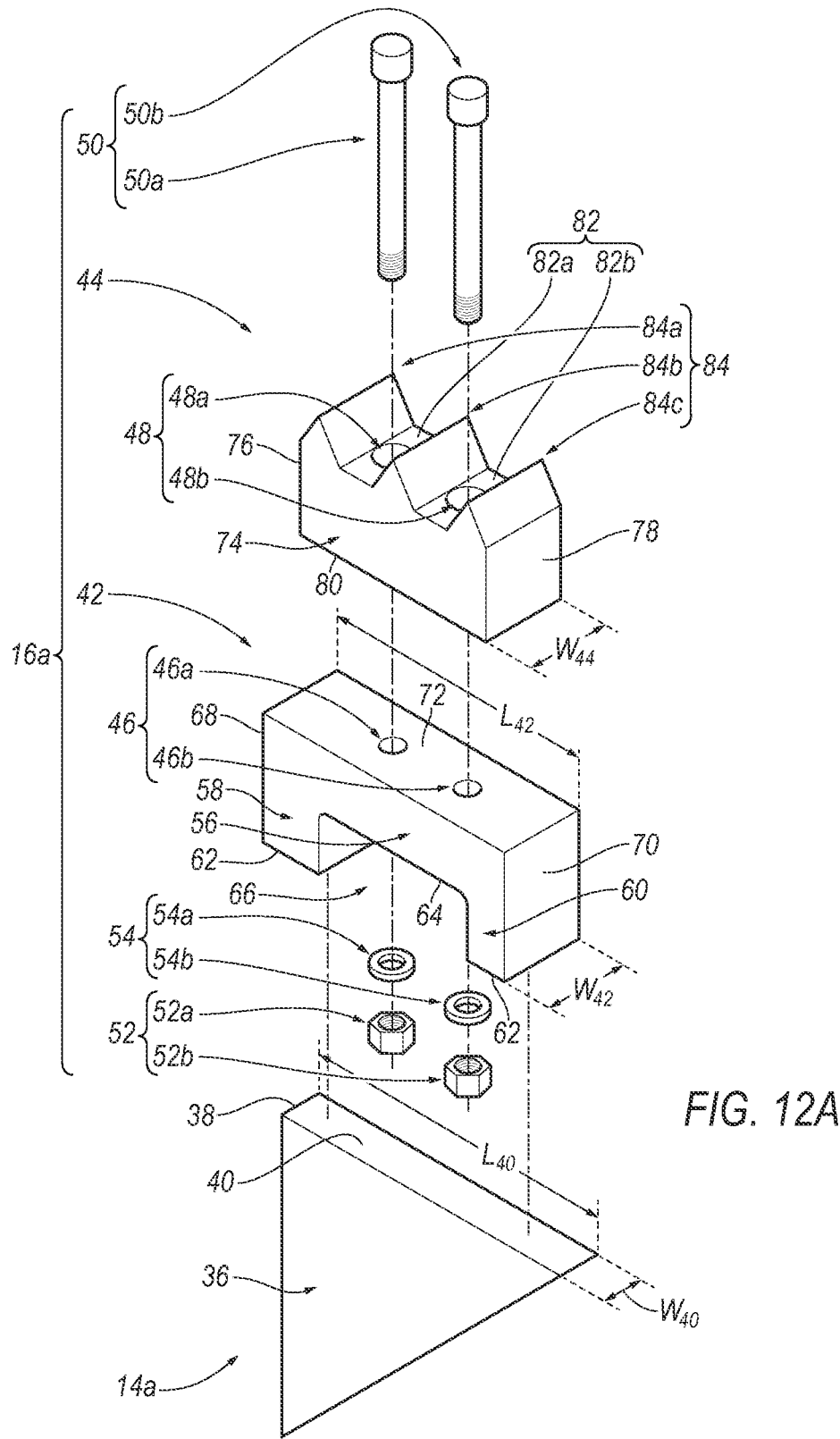
FIG. 12A is an exploded perspective view of a radial cutting member of the cutting device of FIG. 1 and a perspective view of a gusset cutting device of FIG. 1 that is configured for attachment to the shaft of FIGS. 9-11.
Figure 13A:
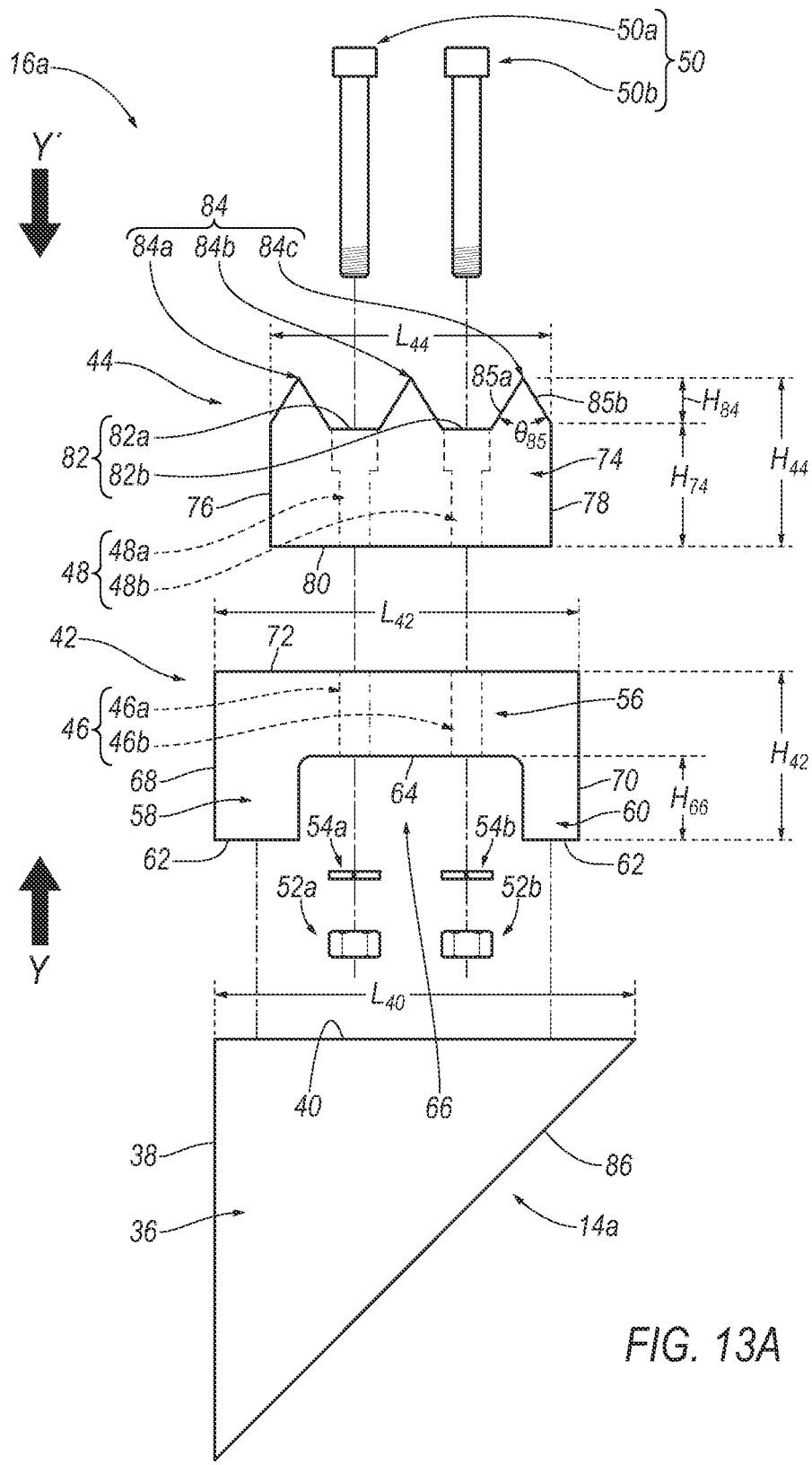
FIG. 13A is an exploded side view of the radial cutting member of FIGS. 12A-12B and a side view of the gusset of FIGS. 12A-12B.

With reference to FIGS. 12A and 13A, in some configurations, the radial base element 42 includes a body 56, a first leg portion 58, and a second leg portion 60. Each of the first leg portion 58 and the second leg portion 60 includes a lower surface 62. The body 56 forms a lower surface 64 extending between the first leg portion 58 and the second leg portion 60; as seen at FIG. 13A, the lower surface 64 of the body 56 is axially offset from the lower surface 62 of each of the first leg portion 58 and the second leg portion 60 at a distance or axial height $H_{66}$ defining a gap or spacing 66 extending between the first leg portion 58 and the second leg portion 60.

As seen at FIGS. 12A and 13A, the body 56 and the first leg portion 58 forms a first side surface 68. The body 56 and the second leg portion 60 forms a second side surface 70 opposite the first side surface 68. The radial base element 42 may include a radial length $L_{42}$ extending between the first side surface 68 and the second side surface 70. The radial base element 42 may also include a width $W_{42}$ extending between outer surfaces of the body 56 of the radial base element 42.

The body 56 forms an upper surface 72 that is opposite: the lower surface 62 of each of the first leg portion 58 and the second leg portion 60; and the lower surface 64 of the body 56. The radial base element 42 may include an axial height $H_{42}$ extending between: the lower surface 62 of each of the first leg portion 58 and the second leg portion 60; and the upper surface 72 of the body 56.

Figure 13B:
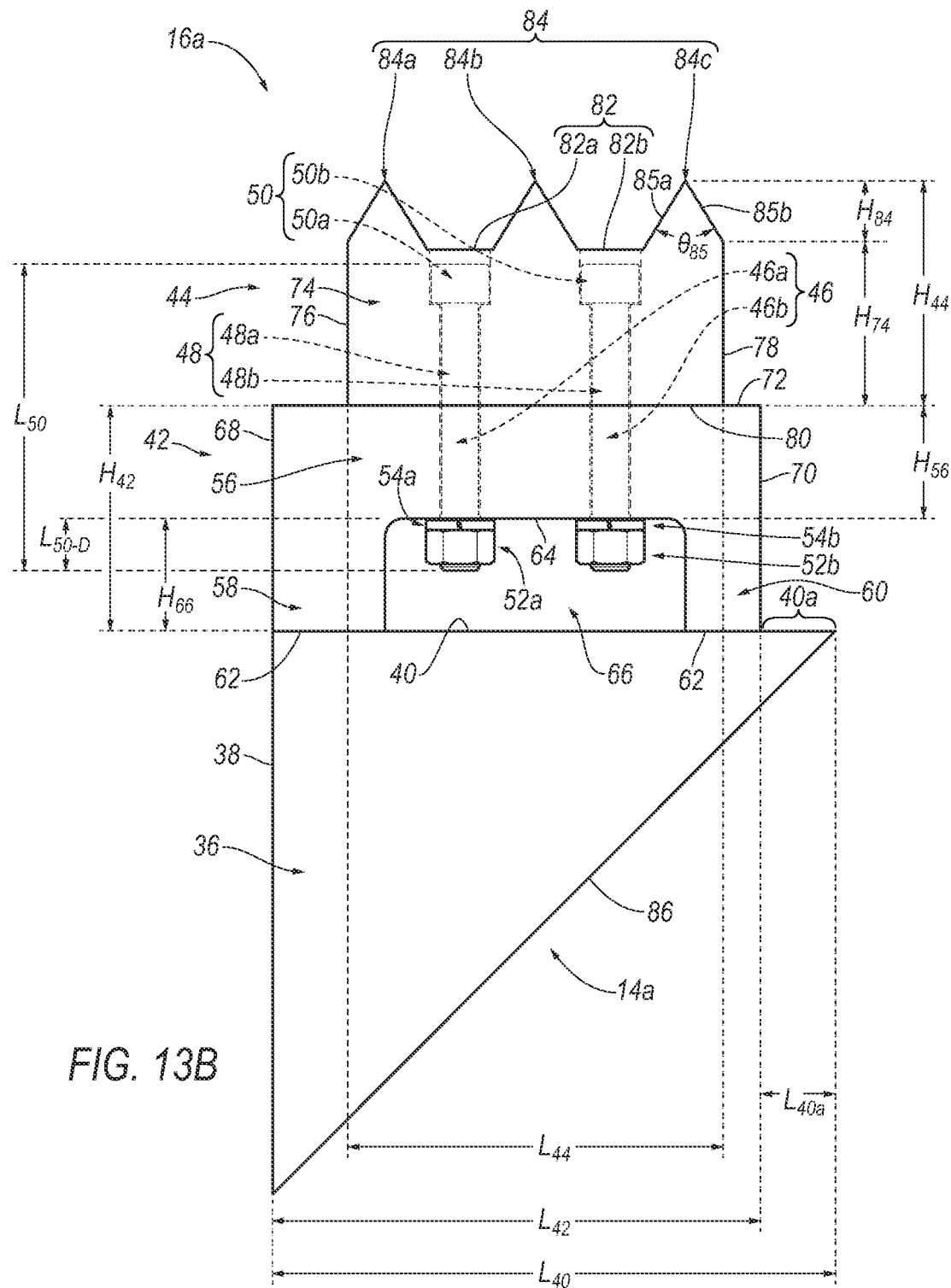
FIG. 13B is an assembled side view of the radial cutting member of FIG. 13A that is secured to the gusset of FIG. 13A.

As seen at FIGS. 7A-7B and 13A, the first fastener 50a and the second fastener 50b of the one or more fasteners 50 are respectively axially inserted in a direction according to an axial arrow Y' for arranging the first fastener 50a and the second fastener 50b of the one or more fasteners 50 respectively within: the first fastener-receiving passage 48a of the radial cutting element 44 and the second fastener-receiving passage 48b of the radial cutting element 44; and then the first fastener-receiving passage 46a of the radial base element 42 and the second fastener-receiving passage 46b of the radial base element 42. As seen at FIG. 13B, an axial length $L_{50}$ of each of the first fastener 50a and the second fastener 50b of the one or more fasteners 50 is greater than an axial height $H_{74}$ of the body 74 of the radial cutting element 44 and an axial height $H_{56}$ of the body 56 of the radial base element 42 such that a distal length portion $L_{50\text{-}D}$ of the axial length $L_{50}$ of the first fastener 50a and the second fastener 50b of the one or more fasteners 50 axially extends beyond the lower surface 64 of the body 56 of the radial base element 42; accordingly, the first nut 52a and the second nut 52b of the one or more nuts 52 and the first washer 54a and the second washer 54b of the one or more washers 54 may be axially coupled in a direction according to the axial arrow Y as seen at FIG. 13A to the distal length portion $L_{50\text{-}D}$ of the axial length $L_{50}$ of the first fastener 50a and the second fastener 50b of the one or more fasteners 50 for axially selectively-retaining the body 56 of the radial base element 42 to the body 74 of the radial cutting element 44 for forming the first radial cutting member 16a.

Referring to FIG. 7A, the first fastener-receiving passage 46a of the one or more fastener-receiving passages 46 of the radial base element 42 may be accessible at: the lower surface 64 of the body 56 of the radial base element 42; and the upper surface 72 of the body 56 of the radial base element 42. Similarly, the second fastener-receiving passage 46b of the one or more fastener-receiving passages 46 of the radial base element 42 may be accessible at: the lower surface 64 of the body 56 of the radial base element 42; and the upper surface 72 of the body 56 of the radial base element 42.

With reference to FIGS. 12A and 13A, in some configurations, the radial cutting element 44 includes a body 74 having a first side surface 76 and a second side surface 78 opposite the first side surface 76. The body 74 of the radial cutting element 44 also includes a lower surface 80 and an upper surface 82 opposite the lower surface 80.

The radial cutting element 44 may include a radial length $L_{44}$ extending between the first side surface 76 and the second side surface 78. The body 74 of the radial cutting element 44 may include an axial height $H_{74}$ extending between the lower surface lower surface 80 and the upper surface 82. The radial cutting element 44 may also include a width $W_{44}$ extending between outer surfaces of the body 74 of the radial cutting element 42.

The radial cutting element 44 also includes one or more radial teeth 84 extending axially away from the upper surface 82 of the radial cutting element 44. The one or more radial teeth 84 may provide a plurality of material deforming surface portions of the first radial cutting member 16a or a plurality of material drilling and/or grinding surface portions of the first radial cutting member 16a that breaks, disrupts, destroys, or reduces in size the hardened steel residue $S_H$ that may obstruct or clog the taphole 1006. The one or more radial teeth 84 may extend axially away from the upper surface 82 at a distance defined by an axial height $H_{84}$. As seen at FIG. 13A, the axial height $H_{74}$ of the body 74 and the axial height $H_{84}$ of the one or more radial teeth 84 collectively form an axial height $H_{44}$ of the radial cutting element 44.

With reference to FIGS. 4 and 13A, in some configurations, the one or more radial teeth 84 may include three teeth defined by a first radial tooth 84a, a second radial tooth 84b, and a third radial tooth 84c. Each of the first radial tooth 84a, the second radial tooth 84b, and the third radial tooth 84c includes a radial inwardly-facing surface 85a and a radial outwardly-facing surface 85b. Furthermore, the radial inwardly-facing surface 85a and the radial outwardly-facing surface 85b cooperate to define a tooth angle $\theta_{85}$.

As seen at FIGS. 12A and 13A, the upper surface 82 may include: a first upper surface portion 82a arranged between the first radial tooth 84a and the second radial tooth 84b. The upper surface 82 may also include second upper surface portion 82b arranged between the second radial tooth 84b and the third radial tooth 84c.

Referring to FIG. 7A, the first fastener-receiving passage 48a of the one or more fastener-receiving passages 48 of the radial cutting element 44 may be accessible at: the lower surface 80 of the body 74 of the radial cutting element 44; and the first upper surface portion 82a of the upper surface 82 of the body 74 of the radial cutting element 44. Similarly, the second fastener-receiving passage 48b of the one or more fastener-receiving passages 48 of the radial cutting element 44 may be accessible at: the lower surface 80 of the body 74 of the radial cutting element 44; and the second upper surface portion 82b of the upper surface 82 of the body 74 of the radial cutting element 44.

Figure 12B:
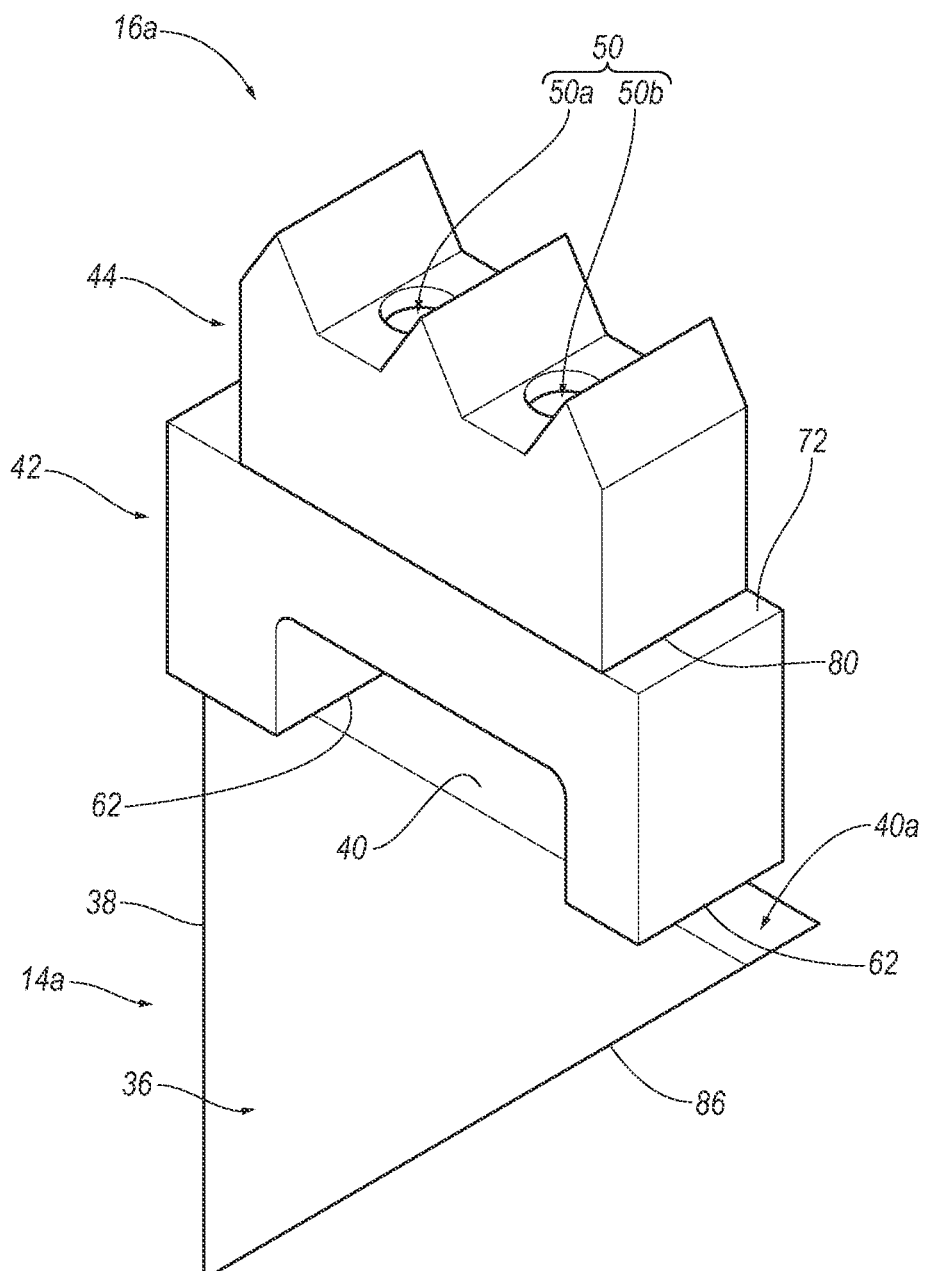
FIG. 12B is an assembled perspective view of the radial cutting member of FIG. 12A that is secured to the gusset of FIG. 12A.

With reference to FIGS. 12B and 13B, once the radial cutting element 44 is removably-attached to the radial base element 42, the lower surface 80 of the body 74 of the radial cutting element 44 is disposed adjacent at least a portion of the upper surface 72 of the body 56 of the radial base element 42. In some configurations, as seen at, for example, FIG. 13A, the radial length $L_{44}$ of the radial cutting element 44 may be less than the radial length $L_{42}$ of the radial base element 42. Accordingly, once the radial cutting element 44 is removably-attached to the radial base element 42, a first portion of the upper surface 72 of the body 56 of the radial base element 42 and a second portion of the upper surface 72 of the body 56 of the radial base element 42 may not be covered by the lower surface 80 of the body 74 of the radial cutting element 44. As seen at FIG. 13B, the first portion of the upper surface 72 of the body 56 of the radial base element 42 extends from the first side surface 68 of the body 56 of the radial base element 42, and the second portion of the upper surface 72 of the body 56 of the radial base element 42 extends from the second side surface 70 of the body 56 of the radial base element 42.

With continued reference to FIGS. 12B and 13B, the radial base element 42 of the first radial cutting member 16a may be attached to of the radially-extending surface 40 of the first gusset 14a. In some implementations, the lower surface 62 of each of the first leg portion 58 and the second leg portion 60 of the body 56 of the radial base element 42 may be attached to the radially-extending surface 40 of the first gusset 14a. Although the above exemplary implementation is described with respect to the first gusset 14a and the first radial cutting member 16a, a similar attachment configuration may also be applied to, respectively, each of the second, third, and fourth gussets 14b, 14c, 14d and each of the second, third, and fourth radial cutting members 16b, 16c, 16d.

Furthermore, as seen at FIG. 13B, in some configurations, the axially-extending surface 38 of the triangular shaped body 36 of the first gusset 14a may be axially aligned with the first side surface 68 of the body 56 of the radial base element 42; accordingly, when the radial base element 42 is attached to the radially-extending surface 40 of the first gusset 14a, the first side surface 68 of the body 56 of the radial base element 42 may be arranged adjacent to the outer side surface 30 of the body 20 of the shaft 12.

Furthermore, as seen at FIG. 13B, the radial length $L_{42}$ of the radial base element 42 may be less than the radially-extending length $L_{40}$ of the radially-extending surface 40 of the triangular shaped body 36 of the first gusset 14a. The difference of the radially-extending length $L_{40}$ of the radially-extending support surface 40 and the radial length $L_{42}$ of the radial base element 42 results in a distal or outer-most radial surface portion 40a of the radially-extending support surface 40 of the triangular shaped body 36 of the first gusset 14a not being axially covered by the radial base element 42 first radial cutting member 16a. Accordingly, as seen at and will be described in the following disclosure and as seen at FIG. 6, the distal or outer-most radial surface portion 40a of the radially-extending surface 40 of the triangular shaped body 36 of the first gusset 14a is configured to provide an axial support surface of the circumferential cutting member 18.

As seen at FIGS. 12B and 13B, the distal or outer-most radial surface portion 40a of the radially-extending surface 40 of the triangular shaped body 36 of the first gusset 14a extends from an outer or outwardly surface 86 of the triangular shaped body 36 of the first gusset 14a. The outer or outwardly surface 86 of the triangular shaped body 36 of the first gusset 14a may define a hypotenuse of the triangular shaped body 36 of the first gusset 14a.

Referring to FIGS. 8A-8B, 14A-14B, and 15A-15B, an exemplary configuration of the circumferential cutting member 18 is shown. The circumferential cutting member 18 is also seen at FIG. 1. However, in order to provide a clearer view of the circumferential cutting member 18 at FIGS. 14A-14B and 15A-15B, one fastener and one washer is shown.

In some implementations, the circumferential cutting member 18 may include a circumferential base element 88 and a circumferential cutting element 90. The circumferential base element 88 may form one or more fastener-receiving passages 92, and the circumferential cutting element 90 may also correspondingly form one or more fastener-receiving passages 94.

The circumferential cutting member 18 may also optionally include: one or more fasteners 96; and one or more washers 98. The one or more fastener-receiving passages 92, 94 are sized for receiving the one or more fasteners 96 for removably-connecting the circumferential base element 88 to the circumferential cutting element 90. As seen at, for example, FIG. 8B, the one or more washers 98 may be arranged between a head portion of the one or more fasteners 96 and a surface of the circumferential base element 88. The one or more fasteners 96 may be threaded fasteners, bolts, or the like; furthermore, one or more fastener-receiving passages 92, 94 may include a cooperating surface, such as, for example, a threaded surface for threadably-receiving a threaded surface of the one or more fasteners 96.

Figure 14A:
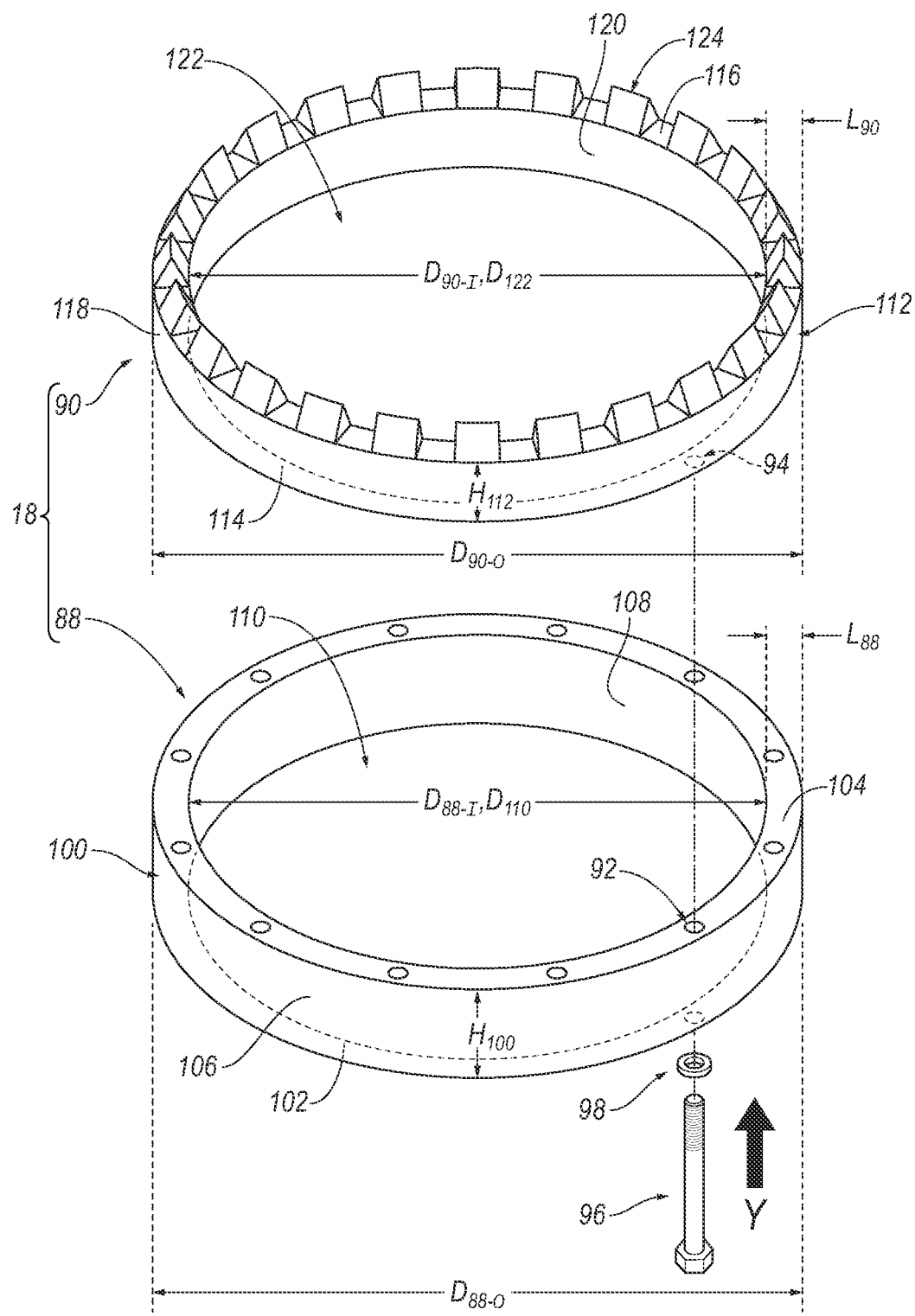
FIG. 14A is an exploded perspective view of a circumferential cutting member of the cutting device of FIG. 1.

As seen at FIGS. 1 and 14A, the one or more fastener-receiving passages 92 of the circumferential base element 88 may include, for example, twelve fastener-receiving passages. The one or more fastener-receiving passages 94 of the circumferential portion 90 may correspondingly include, for example, twelve fastener-receiving passages. Each fastener-receiving passage 92 of the circumferential base element 88 is respectively axially aligned with each corresponding fastener-receiving passage 94 of the circumferential cutting element 90 and are configured for respectively receiving a fastener of the one or more fasteners 96.

Although the circumferential base element 88 is shown separately formed from the circumferential cutting element 90, in other configurations, the circumferential base element 88 and the circumferential cutting element 90 may be integrally formed as one component. Accordingly, in such an exemplary configuration, the circumferential cutting member 18 may not include the one or more fasteners 96 and the one or more washers 98; as such, the one or more fasteners 96 and the one or more washers 98 may be optional components.

With reference to FIGS. 8A-8B, 14A, and 15A, in some configurations, the circumferential base element 88 includes a body 100. The body 100 forms a lower surface 102 and an upper surface 104 arranged opposite the lower surface 102. The body 100 also includes an outer side surface 106 and an inner side surface 108 arranged opposite the outer side surface 106. The outer side surface 106 connects the lower surface 102 to the upper surface 104. The inner side surface 108 connects the lower surface 102 to the upper surface 104. The inner side surface 108 defines a passage 110.

Referring to FIG. 14A, the outer side surface 106 defines an outer diameter $D_{88-O}$ of the body 100 of the circumferential base element 88. The inner side surface 108 defines an inner diameter $D_{88-I}$ of the body 100 of the circumferential base element 88 as well as a passage diameter $D_{110}$ of the passage 110.

In some configurations, the outer diameter $D_{88-O}$ of the body 100 of the circumferential base element 88 may define a maximum diameter of the circumferential cutting member 18. Furthermore, the outer diameter $D_{88-O}$ of the body 100 of the circumferential base element 88 may be approximately the same as but less than the diameter $D_{1006}$ of the taphole 1006 in order to permit axial insertion of the circumferential cutting member 18 into the taphole 1006, and furthermore, the cutting device 10 into the taphole 1006 as seen at FIGS. 17B-17E. Accordingly, in some configurations, the outer diameter $D_{88-O}$ of the body 100 of the circumferential base element 88 may range from about sixteen inches to about twenty-two inches. In other configurations, the outer diameter $D_{88-O}$ of the body 100 of the circumferential base element 88 may be less than approximately nineteen inches such as, for example, eighteen-and-one-quarter inches.

Figures 8A, 8B:
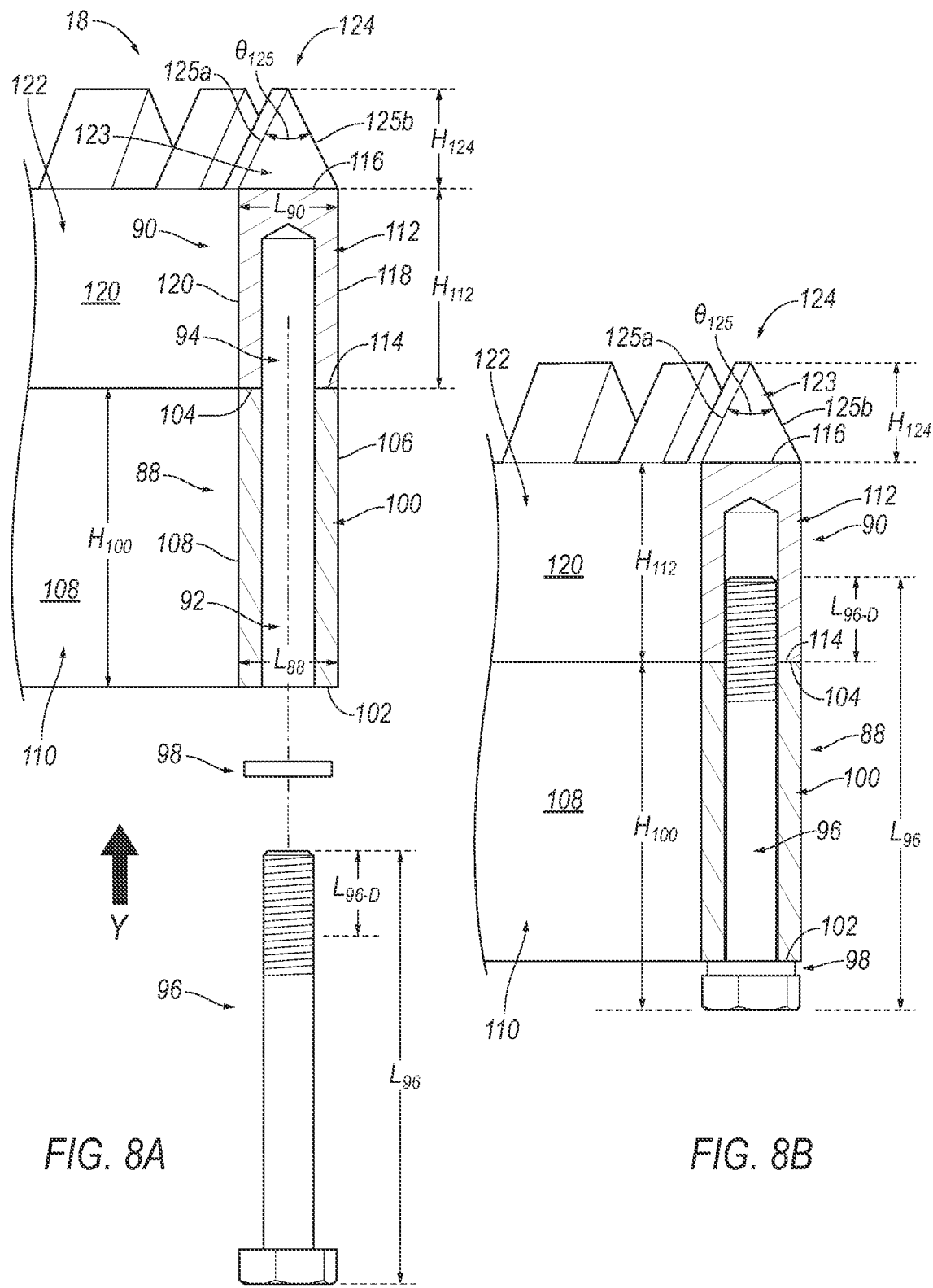
FIG. 8A is an exploded cross-sectional view of the cutting device referenced from line 8-8 of FIG. 4.
FIG. 8B is an assembled cross-sectional view of the cutting device according to line 8-8 of FIG. 4.

Referring to FIGS. 8A and 14A, both of the lower surface 102 and the upper surface 104 of the body 100 of the circumferential base element 88 define a radial length $L_{88}$ of the circumferential base element 88 extending between the outer side surface 106 and the inner side surface 108 of the body 100 of the circumferential base element 88. The body 100 of the circumferential base element 88 may include an axial height $H_{100}$ extending between the lower surface 102 and the upper surface 104 of the body 100 of the circumferential base element 88.

The radial length $L_{88}$ of the circumferential base element 88 extending between the outer side surface 106 and the inner side surface 108 of the body 100 of the circumferential base element 88 may be configured for permitting attachment of the lower surface 102 of the circumferential base element 88 of the circumferential cutting member 18 to the distal or outer-most radial surface portion 40a of the radially-extending surface 40 of the triangular shaped body 36 of each gusset 14a, 14b, 14c, 14d of the one or more gussets 14. In some configurations, the radial length $L_{88}$ of the circumferential base element 88 extending between the outer side surface 106 and the inner side surface 108 of the body 100 of the circumferential base element 88 may be approximately equal to a radial length $L_{40a}$ of the distal or outer-most radial surface portion 40a of the radially-extending surface 40 of the triangular shaped body 36 of each of the first, second, third, and fourth radial cutting members 16a, 16b, 16c, 16d of the one or more radial cutting members 16.

Referring to FIG. 8A, each fastener-receiving passage 92 of the one or more fastener-receiving passages 92 extends along the axial height $H_{100}$ of the body 100 of the circumferential base element 88 and is accessible at each of the lower surface 102 and the upper surface 104 of the body 100 of the circumferential base element 88. With reference to FIG. 8B, the axial height $H_{100}$ of the body 100 of the circumferential base element 88 is less than an axial length $L_{96}$ of each fastener 96 of the one or more fasteners 96; accordingly, as seen at FIG. 8B, upon fully axially arranging each fastener 96 of the one or more fasteners 96 within, respectively, each fastener-receiving passage 92 of the one or more fastener-receiving passages 92 in a direction according to the arrow Y from the lower surface 102 of the body 100 of the circumferential base element 88 toward the upper surface 104 of the body 100 of the circumferential base element 88, at least a distal length portion $L_{96-D}$ of each fastener 96 of the one or more fasteners 96 may be arranged axially beyond the upper surface 104 of the body 100 of the circumferential base element 88.

Referring to FIGS. 8A-8B, 14A-14B, and 15A-15B, in some configurations, the circumferential cutting element 90 includes a body 112. The body 112 forms a lower surface 114 and an upper surface 116 arranged opposite the lower surface 114. The body 112 also includes an outer side surface 118 and an inner side surface 120 arranged opposite the outer side surface 118. The outer side surface 118 connects the lower surface 114 to the upper surface 116. The inner side surface 120 connects the lower surface 114 to the upper surface 116. The inner side surface 120 defines a passage 122.

The outer side surface 118 defines an outer diameter $D_{90-O}$ of the body 112 of the circumferential cutting element 90. The inner side surface 120 defines an inner diameter $D_{90-I}$ of the body 112 of the circumferential cutting element 90 as well as a passage diameter $D_{122}$ of the passage 122. Furthermore, the outer diameter $D_{90-O}$ of the body 112 of the circumferential cutting element 90 may be approximately the same as but less than the diameter $D_{1006}$ of the taphole 1006 in order to permit axial insertion of the circumferential cutting member 18 into the taphole 1006, and furthermore, the cutting device 10 into the taphole 1006, as seen at FIGS. 17B-17E. Accordingly, in some configurations, the outer diameter $D_{90-O}$ of the body 112 of the circumferential cutting element 90 may range from approximately sixteen inches to approximately twenty-two inches. In other configurations, the outer diameter $D_{90-O}$ of the body 112 of the circumferential cutting element 90 may be less than approximately nineteen inches such as, for example, eighteen-and-one-quarter inches.

In some configurations, the outer diameter $D_{90-O}$ of the body 112 of the circumferential cutting element 90 may define a maximum diameter of the circumferential cutting member 18. Furthermore, the outer diameter $D_{90-O}$ of the body 112 of the circumferential cutting element 90 may be approximately the same as but less than the diameter $D_{1006}$ of the taphole 1006 in order to permit axial insertion of the circumferential cutting member 18 into the taphole 1006, and furthermore, the cutting device 10 into the taphole 1006 as seen at FIGS. 17B-17E.

Referring to FIGS. 8A and 14A, both of the lower surface 114 and the upper surface 116 of the body 112 of the circumferential cutting element 90 define a radial length $L_{90}$ of the circumferential cutting element 90 extending between the outer side surface 118 and the inner side surface 120 of the body 112 of the circumferential cutting element 90. The body 112 of the circumferential cutting element 90 may include an axial height $H_{112}$ extending between the lower surface 114 and the upper surface 116 of the body 112 of the circumferential cutting element 90.

Referring to FIG. 8A, each fastener-receiving passage 94 of the one or more fastener-receiving passages 94 extends along the axial height $H_{112}$ of the body 112 of the circumferential cutting element 90 and is accessible at each of the lower surface 114 and the upper surface 116 of the body 112 of the circumferential cutting element 90. With reference to FIG. 8B, the axial height $H_{112}$ of the body 112 of the circumferential cutting element 90 is greater than the distal length portion $L_{96-D}$ of each fastener 96 of the one or more fasteners 96; accordingly, as seen at FIG. 8B, upon fully axially arranging each fastener 96 of the one or more fasteners 96 within, respectively: each fastener-receiving passage 92 of the one or more fastener-receiving passages 92 in the direction according to the arrow Y from the lower surface 102 of the body 100 of the circumferential base element 88 toward the upper surface 104 of the body 100 of the circumferential base element 88; and each fastener-receiving passage 94 of the one or more fastener-receiving passages 94 in the direction according to the arrow Y from the lower surface 114 of the body 112 of the circumferential cutting element 90 toward the upper surface 116 of the body 112 of the circumferential cutting element 90, the distal length portion $L_{96-D}$ of each fastener 96 of the one or more fasteners 96 may be disposed respectively with each fastener-receiving passage 94 of the one or more fastener-receiving passages 94 such that the distal length portion $L_{96-D}$ of each fastener 96 of the one or more fasteners 96 are arranged within the body 112 of the circumferential cutting element 90 and not arranged axially beyond the upper surface 116 of the body 112 of the circumferential cutting element 90.

The circumferential cutting element 90 also includes one or more circumferential teeth 124 extending axially away from the upper surface 116 of the body 112 of the circumferential cutting element 90. The one or more circumferential teeth 124 may provide a plurality of material deforming surface portions of the circumferential cutting member 18 or a plurality of material drilling and/or grinding surface portions of the circumferential cutting member 18 that breaks, disrupts, destroys, or reduces in size the hardened steel residue $S_H$ that may obstruct or clog the taphole 1006. The one or more circumferential teeth 124 may extend axially away from the upper surface 116 of the body 112 of the circumferential cutting element 90 at a distance defined by an axial height $H_{124}$. The axial height $H_{112}$ of the body 112 of the circumferential cutting element 90 and the axial height $H_{124}$ of the one or more circumferential teeth 124 collectively form an axial height of the circumferential cutting element 90.

As seen at FIG. 4, each tooth of the one or more circumferential teeth 124 defines a triangular cross-sectional profile taken along the circumferential direction of the body 112. Thus, each circumferential tooth 124 includes a pair of triangular end surfaces 123 formed on opposite ends of the circumferential tooth 124, which extend substantially perpendicular from the upper surface 116 of the body 112. Each circumferential tooth 124 also includes a pair of angled side surfaces 125 extending between the end surfaces 123, including a radially inwardly facing surface 125a and a radially outwardly facing surface 125b. As seen at FIGS. 8A-8B, the radially inwardly facing surface 125a and the radially outwardly facing surface 125b converge with each other along a direction from the upper surface 116 to define a circumferential tooth angle $\theta_{125}$.

In some configurations, the one or more circumferential teeth 124 may include, for example, twenty-four teeth. As seen at FIG. 4, opposing end surfaces 123 of adjacent ones of the circumferential teeth 124 are spaced apart from each other by respective portions of the upper surface 116 of the body 112 of the circumferential cutting element 90. The end surfaces 123 of adjacent ones of the circumferential teeth 124 of the one or more circumferential teeth 124 of the circumferential cutting element 90 may be spaced apart by an arcuate distance A124 that is bound by an angle $\theta_{124}$. The angle $\theta_{124}$ may range from approximately 5° to 10°.

Figure 14B:
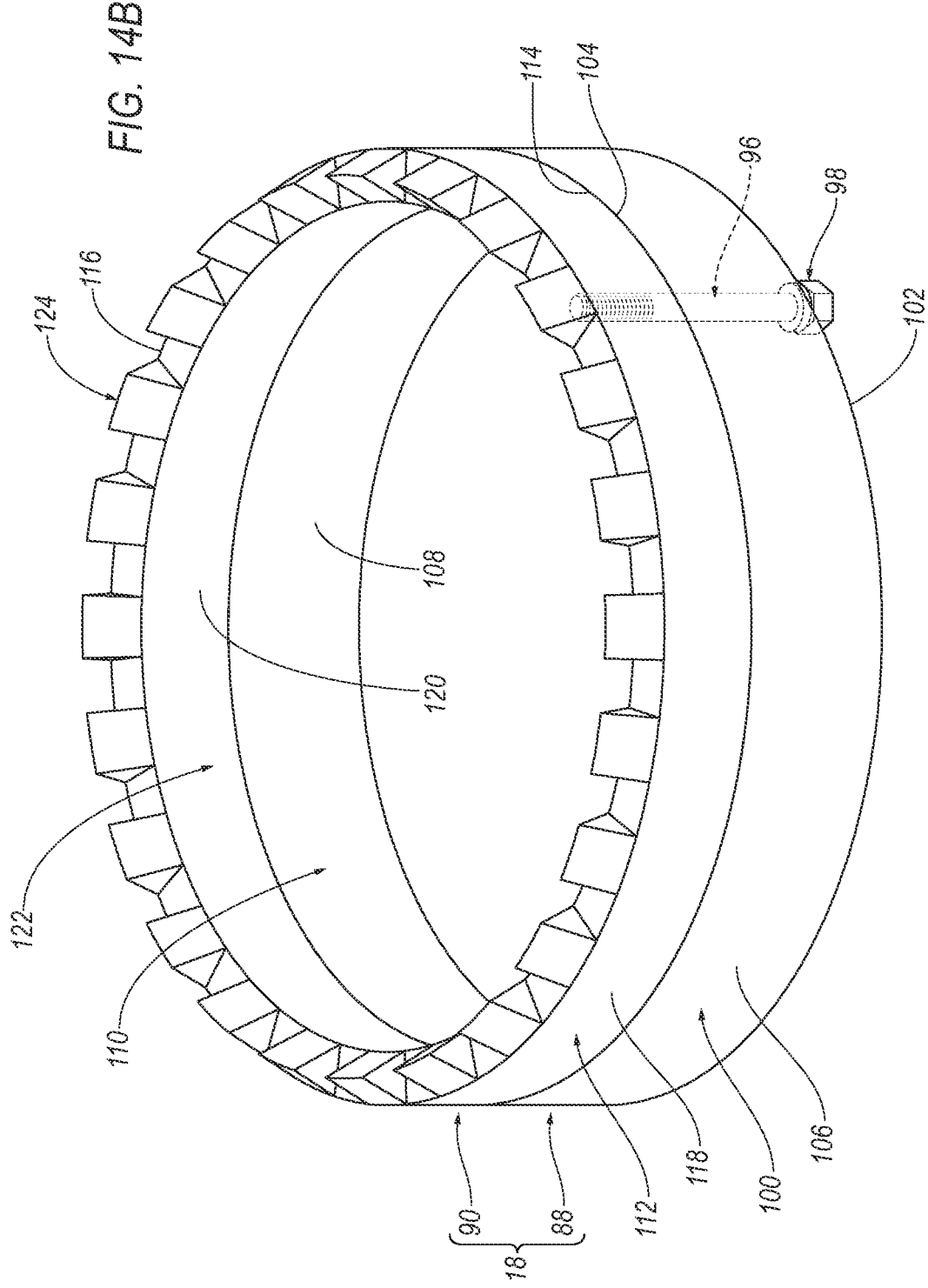
FIG. 14B is an assembled perspective view of the circumferential cutting member FIG. 14A.
Figure 15A:
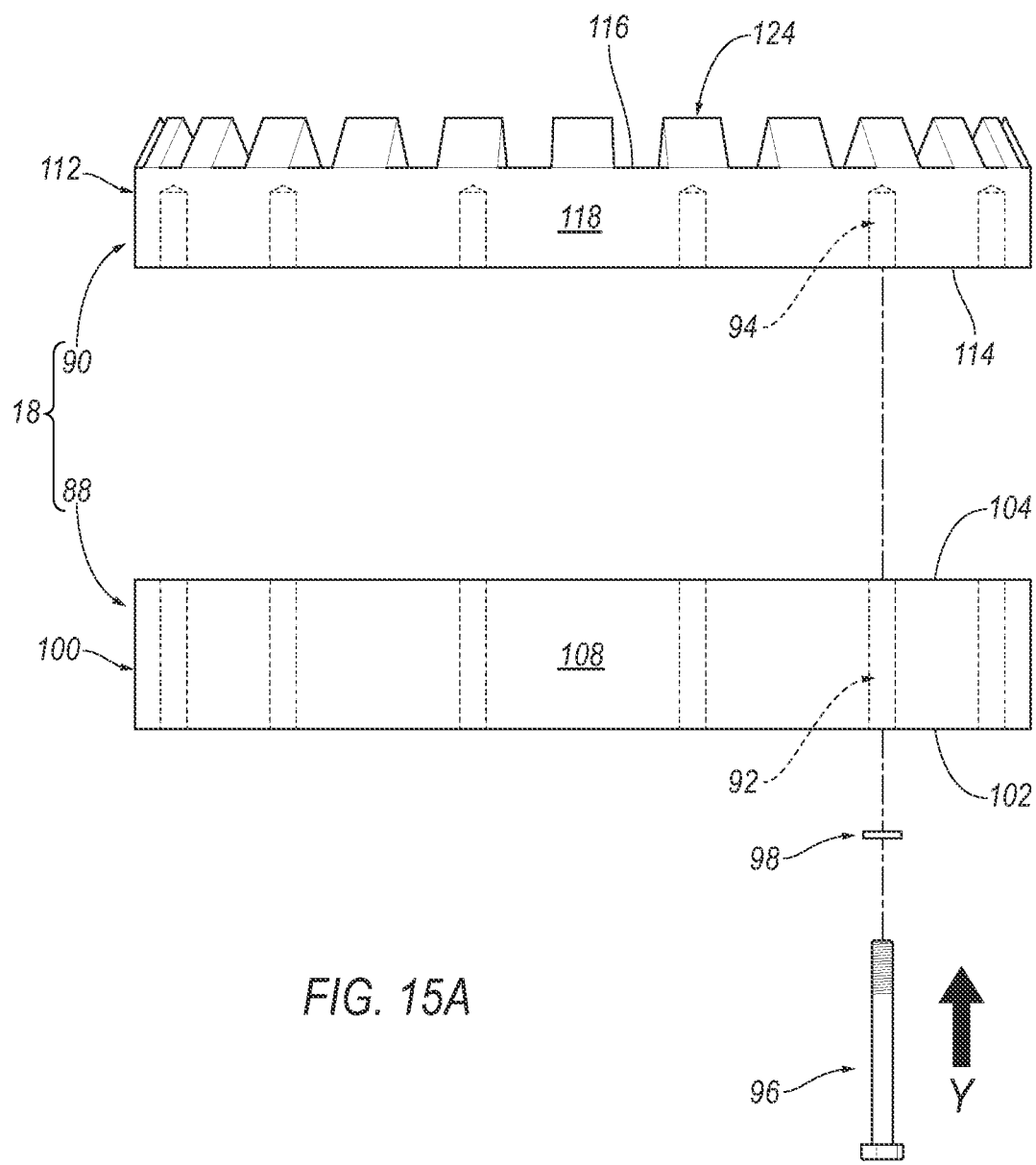
FIG. 15A is an exploded side view of the circumferential cutting member of FIGS. 14A-14B.
Figure 15B:
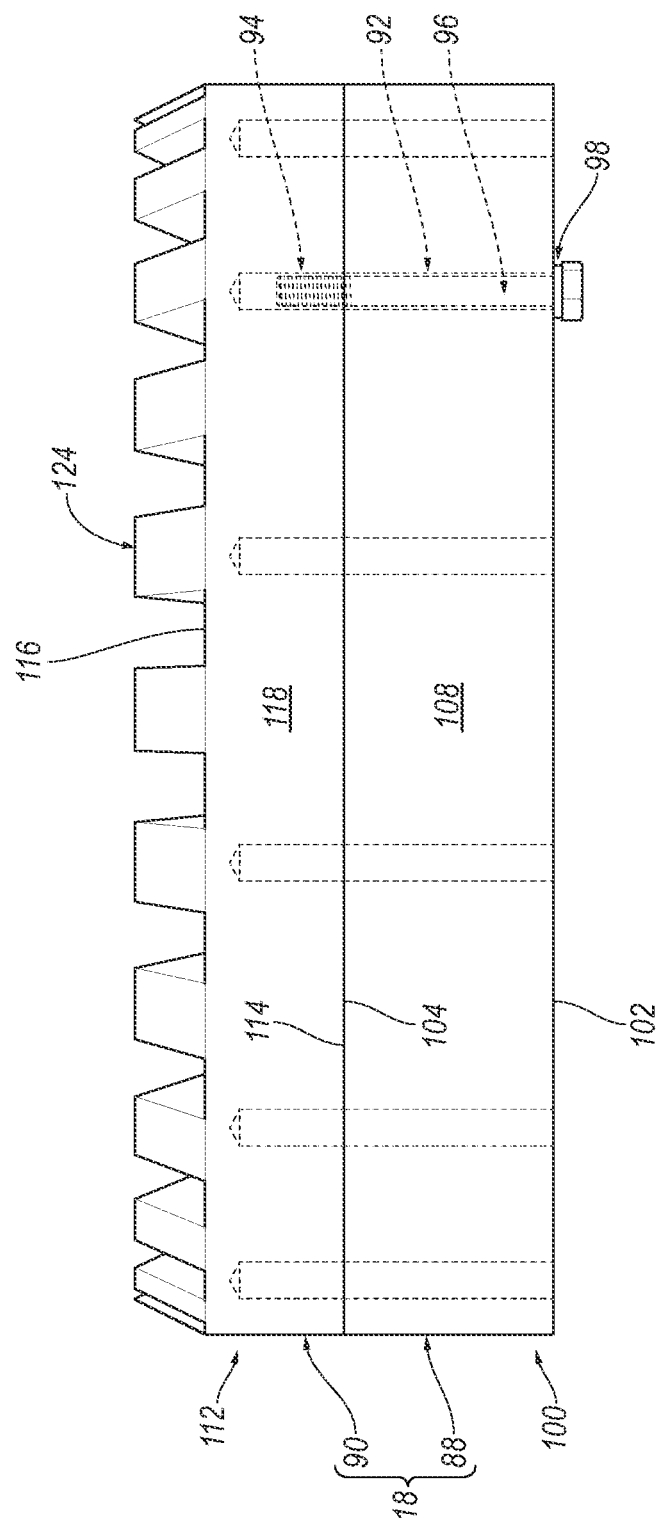
FIG. 15B is an assembled side view of the circumferential cutting member FIG. 15A.

As seen at FIGS. 8B, 14B, and 15B, upon attaching the circumferential cutting element 90 to the circumferential base element 88 with the one or more fasteners 96 for forming the circumferential cutting member 18, the circumferential cutting member 18 is then attached to the distal or outer-most radial surface portion 40a of the radially-extending surface 40 of the triangular shaped body 36 of each gusset 14a, 14b, 14c, 14d of the one or more gussets 14.

As seen at FIG. 6, upon attaching the circumferential cutting member 18 to the distal or outer-most radial surface portion 40a of the radially-extending surface 40 of the triangular shaped body 36 of each gusset 14a, 14b, 14c, 14d of the one or more gussets 14, the lower surface 102 of the body 100 of the circumferential base element 88 of the circumferential cutting member 18 may be disposed adjacent all of the distal or outer-most radial surface portion 40a of the radially-extending surface 40 of the triangular shaped body 36 of each of the first, second, third, and fourth radial cutting members 16a, 16b, 16c, 16d of the one or more radial cutting members 16. Furthermore, as also seen at FIG. 6, in some configurations, the inner side surface 108 of the body 100 of the circumferential base element 88 of the circumferential cutting member 18 may be disposed adjacent the second side surface 70 of the body 56 of the radial base element 42 of each of the first, second, third, and fourth radial cutting members 16a, 16b, 16c, 16d of the one or more radial cutting members 16.

Even further, as also seen at FIG. 6, in some configurations, the inner side surface 120 of the body 112 of the circumferential cutting element 90 of the circumferential cutting member 18 may be disposed opposite of and not adjacent to the second side surface 78 of the body 56 of the radial cutting element 44 of each of the first, second, third, and fourth radial cutting members 16a, 16b, 16c, 16d of the one or more radial cutting members 16 thereby forming a spacing or gap 126 there between. With continued reference to FIG. 6, the one or more radial teeth 84 of the radial cutting element 44 of each of the first, second, third, and fourth radial cutting members 16a, 16b, 16c, 16d of the one or more radial cutting members 16 and the one or more circumferential teeth 124 of the circumferential cutting element 90 of the circumferential cutting member 18 may be radially aligned with one another such that an axially distal-most end or point of the radial teeth 84, 124 may be axially aligned according to a first radial plane $P_{84-124}$ that is orthogonal to the central axis $A_{10}$-$A_{10}$ or the central axis $A_{12}$-$A_{12}$ of the cutting device 10 the shaft 12. The first radial plane $P_{84-124}$ may be axially spaced apart and axially distanced at an axial distance or an axial height $H_{12-16}$ from a second radial plane $P_{28}$ that is orthogonal to the central axis $A_{10}$-$A_{10}$ or the central axis $A_{12}$-$A_{12}$ of the cutting device 10 the shaft 12 and extends across the distal tip 28 formed by the second end 24 of the body 20 of the shaft 12.

Referring to FIGS. 16A-16C and 17A-17F, a methodology for utilizing the cutting device 10 is described. The methodology may be performed manually by an operator that controls one or more of the moving device 1050 and the arm portion 1052 of the moving device 1050. Alternatively, the methodology may be performed by a robotic system that may be associated with or a component of one or both of the moving device 1050 and the arm portion 1052. Accordingly, one or both of the moving device 1050 and the arm portion 1052 may include one or more sensors that will provide information to a computing device for executing instructions for operating one or both of the moving device 1050 and the arm portion 1052 as follows.

In some implementations, the moving device 1050 is configured to operate the arm portion 1052 and/or a motor of the arm portion 1052 that may be configured to move the cutting device 10. Movement of the cutting device 10 may include, but is not limited to: reciprocating axial "hammering" movement, rotational movement, or a combination of reciprocating axial "hammering" movement and rotational movement. In some implementations, if the moving device 1050 includes the computing device, the computing device may permit the moving device 1050 to operate autonomously and/or semi-autonomously. However, in other implementations, a user may operate the moving device 1050 by providing commands/directions to the moving device 1050 in order to manually operate the moving device 1050 or semi-autonomously operating the moving device 1050 by, for example, programming the computing device such that the moving device 1050 is not actively manually operated by a user or human operator. In some examples, the moving device 1050 may include a control system communicatively coupled to, for example, the motor' the control system may include a controller, memory hardware, actuators, one or more sensors, and one or more power sources. The control system is not limited to such components, and may include additional or less components without departing from the scope of the present disclosure. The components may communicate via wireless or wired connections and may be distributed across multiple locations of the moving device 1050. In some configurations, the control system interfaces with a remote computing device and/or a user. For instance, the control system may include various components for communicating with the arm portion 1052, such as a joystick, buttons, wired communication ports, and/or wireless communication ports for receiving inputs from the remote computing device and/or user, and providing feedback to the remote computing device and/or user.

Figure 17B:
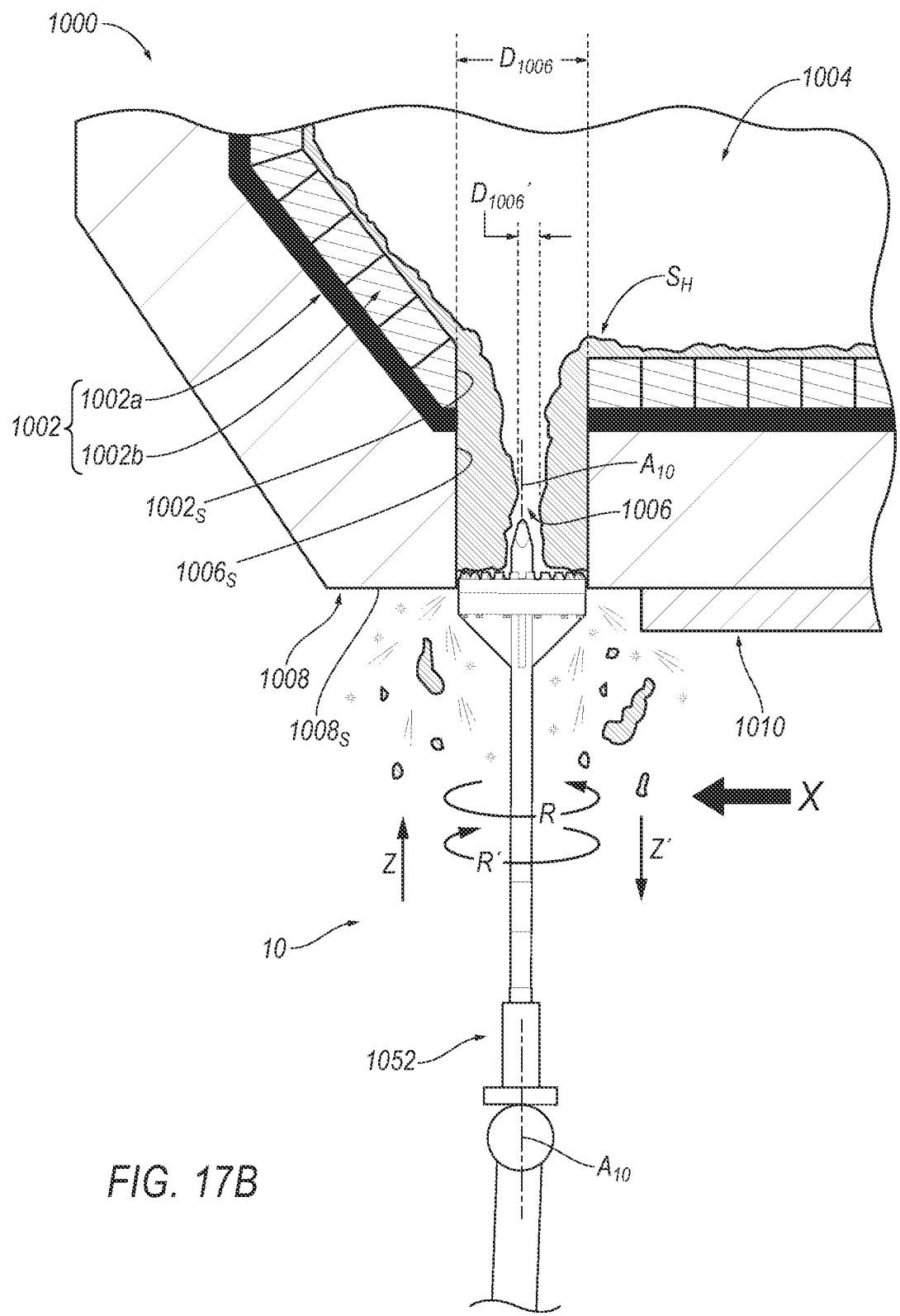
FIG. 17B is a further view according to FIG. 17A whereby the portion of the moving device is shown arranging the cutting device axially within the taphole of the material processing device for removing an obstruction arranged within the taphole.
Figure 17C:
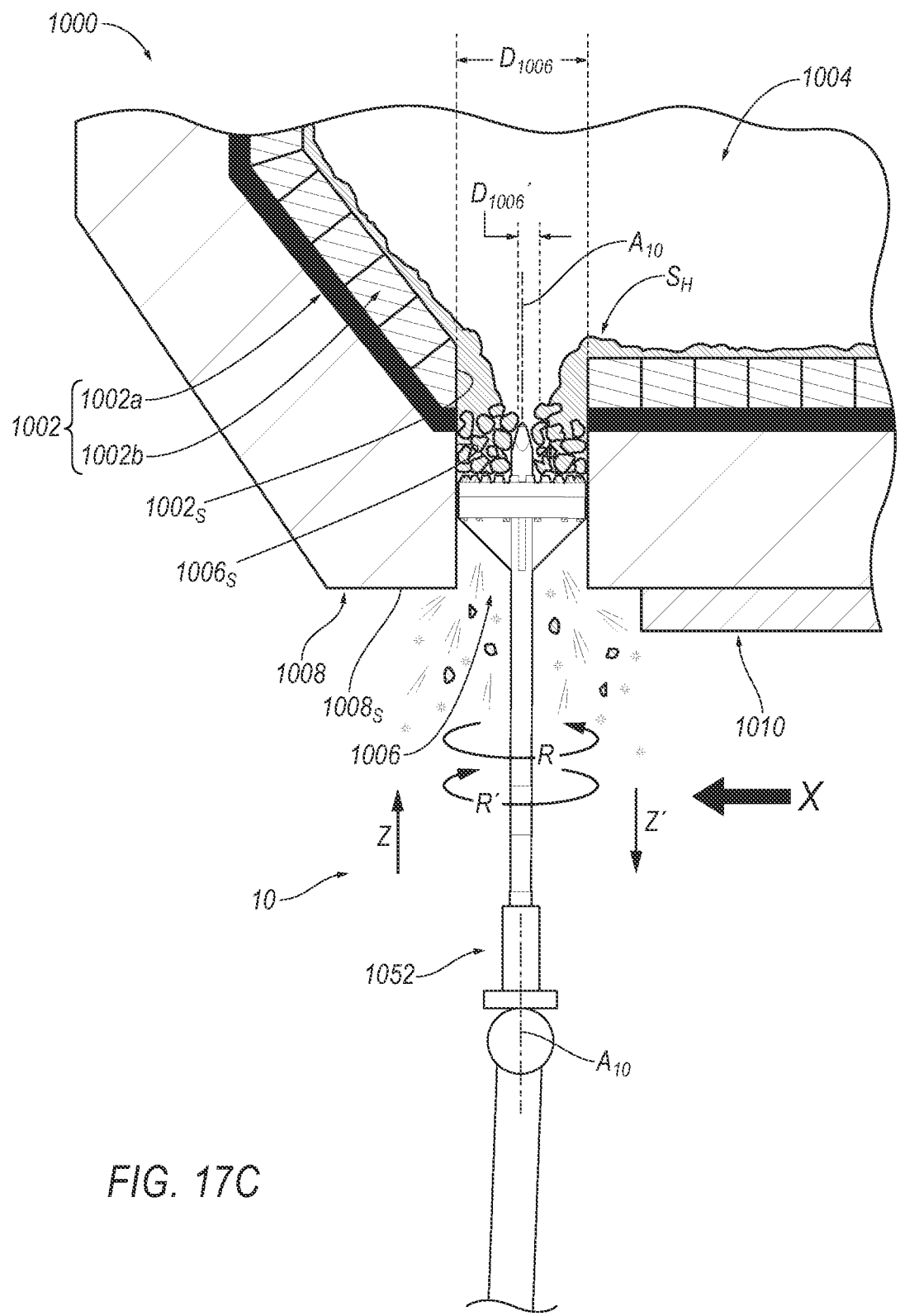
FIG. 17C is a further view according to FIG. 17B whereby the portion of the moving device is shown arranging the cutting device further axially within the taphole of the material processing device for further removing the obstruction arranged within the taphole.
Figure 17D:
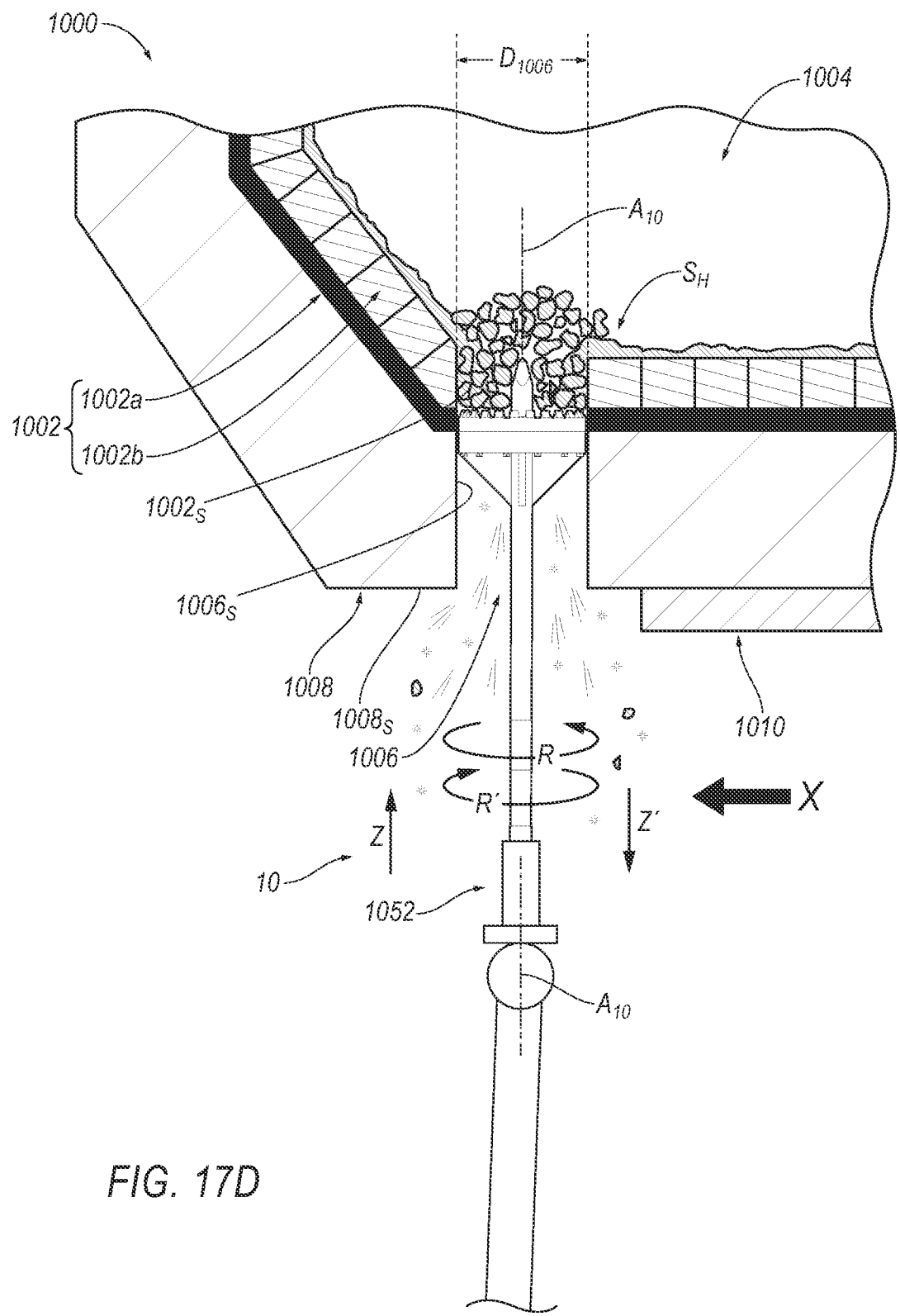
FIG. 17D is a further view according to FIG. 17C whereby the portion of the moving device is shown arranging the cutting device further axially within the taphole of the material processing device for further removing the obstruction arranged within the taphole.
Figure 17E:
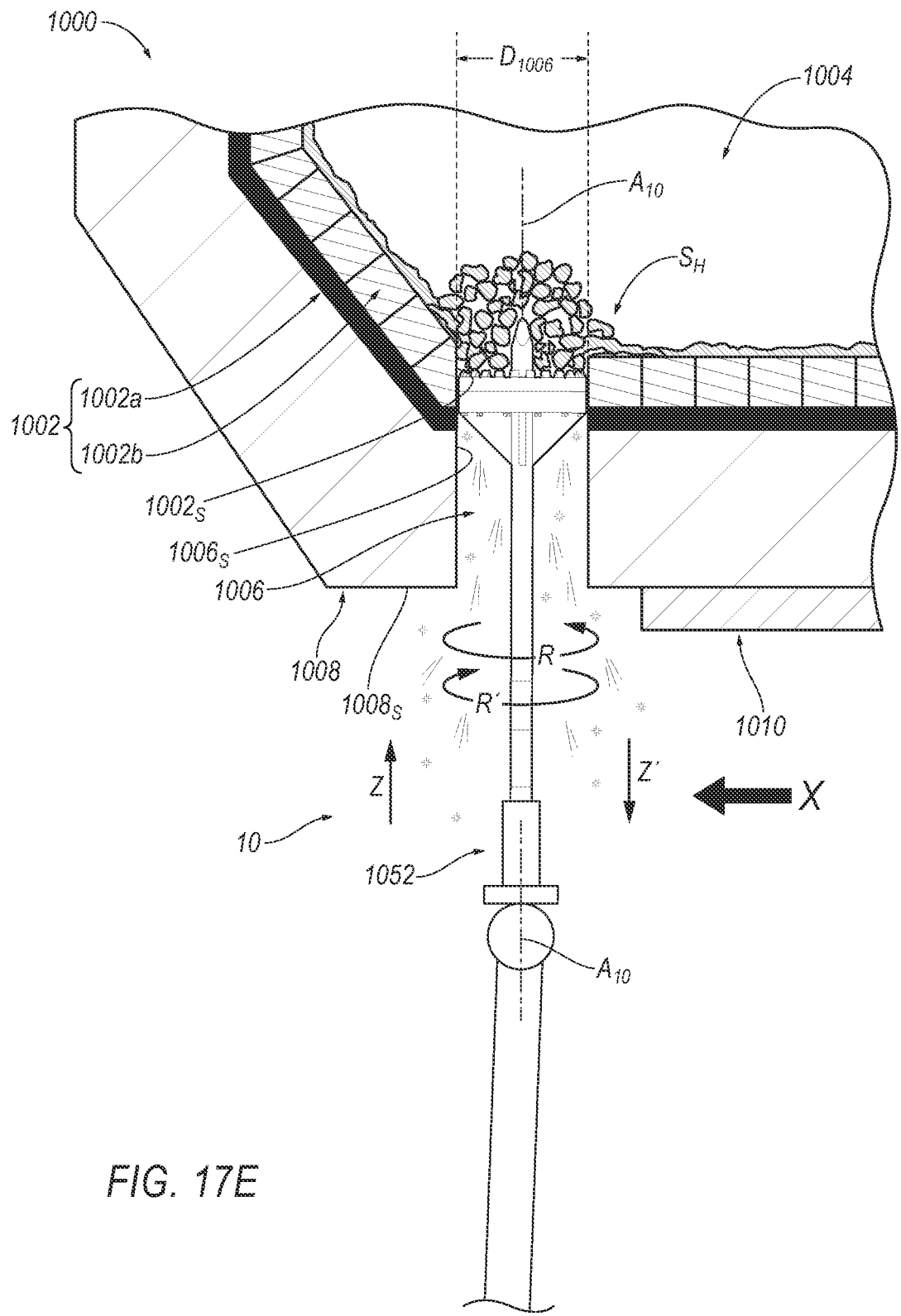
FIG. 17E is a further view according to FIG. 17D whereby the portion of the moving device is shown arranging the cutting device further axially within the taphole of the material processing device for further removing the obstruction arranged within the taphole.

Firstly, as seen at FIG. 16A, the cutting device 10 may be arranged proximate but not attached to the moving device 1050. As seen at FIG. 16B, the moving device 1050 may be arranged proximate the cutting device 10 such that the arm portion 1052, which may include a female portion, recess or cavity, is sized or configured to receive a portion of the length $L_{12}$ of the shaft 12 extending from the first end 22 of the shaft 12. The female portion, recess or cavity of the arm portion 1052 may include a cooperating surface geometry configured to mate with or be selectively removably connected to the second outer side surface portion 34 of the shaft 12. Once the shaft 12 of the cutting device 10 is selectively removably connected to the arm portion 1052 of the moving device 1050, the moving device 1050 may arrange the cutting device 10 proximate, near, or axially within the taphole 1006 as seen at FIGS. 16C and 17A-17B.

With reference to FIG. 17A, the arm portion 1052 of the moving device 1050 is shown arranging the cutting device near but not within the taphole of the material processing device. Thereafter, at FIG. 17B, the arm portion 1052 may be arranged relative the taphole 1006 such that the central axis $A_{10}$-$A_{10}$/$A_{12}$-$A_{12}$ of the cutting device 10/the shaft 12 is axially aligned with the central axis $A_{1006}$-$A_{1006}$ extending through the taphole 1006 to permit subsequent axial insertion of the cutting device 10/the shaft 12 axially into the taphole 1006.

Thereafter, as seen at FIGS. 17B-17E, a motor of one of the moving device 1050 or the arm portion 1052 is actuated in order to impart movement of the cutting device 10. In a first implementation, a first type of movement of the arm portion 1052 may include a reciprocating axial "hammering" movement Z/Z' of the shaft 12; such movement Z/Z' of the shaft 12 does not include rotational movement R/R' of the shaft 12. The reciprocating axial "hammering" movement Z/Z' of the shaft 12 may include a repeating up movement and down movement along the central axis $A_{1006}$-$A_{1006}$ of the taphole 1006. The axial upstroke of the shaft 12 in the direction according to the arrow Z and the axial downstroke of the shaft 12 in the direction according to the arrow Z' is controlled by the motor that drives movement of the arm portion 1052. Furthermore, a frequency of the up-and-down movement Z/Z' of the shaft 12 is controlled by the motor that drives movement of the arm portion 1052. In some implementations, one cycle of up-and-down movement Z/Z' of the shaft 12 may occur quickly, and, as such, the up-and-down movement Z/Z' of the shaft 12 may be defined as a high frequency movement.

In another implementation, a second type of movement of the arm portion 1052 may include a rotational movement R/R' of the shaft 12; such movement R/R' of the shaft 12 does not include rotational movement reciprocating axial "hammering" movement Z/Z' of the shaft 12. In yet another implementation, a third type of movement of the arm portion 1052 may include a combination of reciprocating axial "hammering" movement Z/Z' and rotational movement R/R' of the shaft 12. In some implementations, the arm portion 1052 is moved by the motor, which, in turn, imparts one of or a combination of reciprocating axial "hammering" movement Z/Z' to the shaft 12 and rotational movement R/R' to the shaft 12. The reciprocating axial "hammering" movement Z/Z', alone, to the shaft 12 and/or rotational movement R/R' to the shaft 12 also results in corresponding movement imparted to: the central tooth defined by the first outer side surface portion 32 of the shaft 12; the one or more radial teeth 84 of the radial cutting element 44 of each of the first radial cutting member 16a, the second radial cutting member 16b, the third radial cutting member 16c, and the fourth radial cutting member 16d; and the one or more circumferential teeth 124 of the circumferential cutting element 90 of the circumferential cutting member 18.

As seen at FIGS. 17B-17E, as the shaft 12 is moved Z/Z' and/or R/R', the hardened steel residue $S_H$ is broken, disrupted, destroyed, or reduced in size by the teeth 32, 84, 124 of the cutting device 10. The broken or reduced pieces of the hardened steel residue $S_H$ may fall with the assistance of gravity out of the taphole 1006 and axially through a head portion of the cutting device 10. The axial evacuation of the hardened steel residue $S_H$ through the head portion 14, 16, 18 of the cutting device 10 occurs as a result of gaps or spacing between the one or more gussets 14 that are spaced apart at the angle $\theta_{14}$.

Figure 17F:
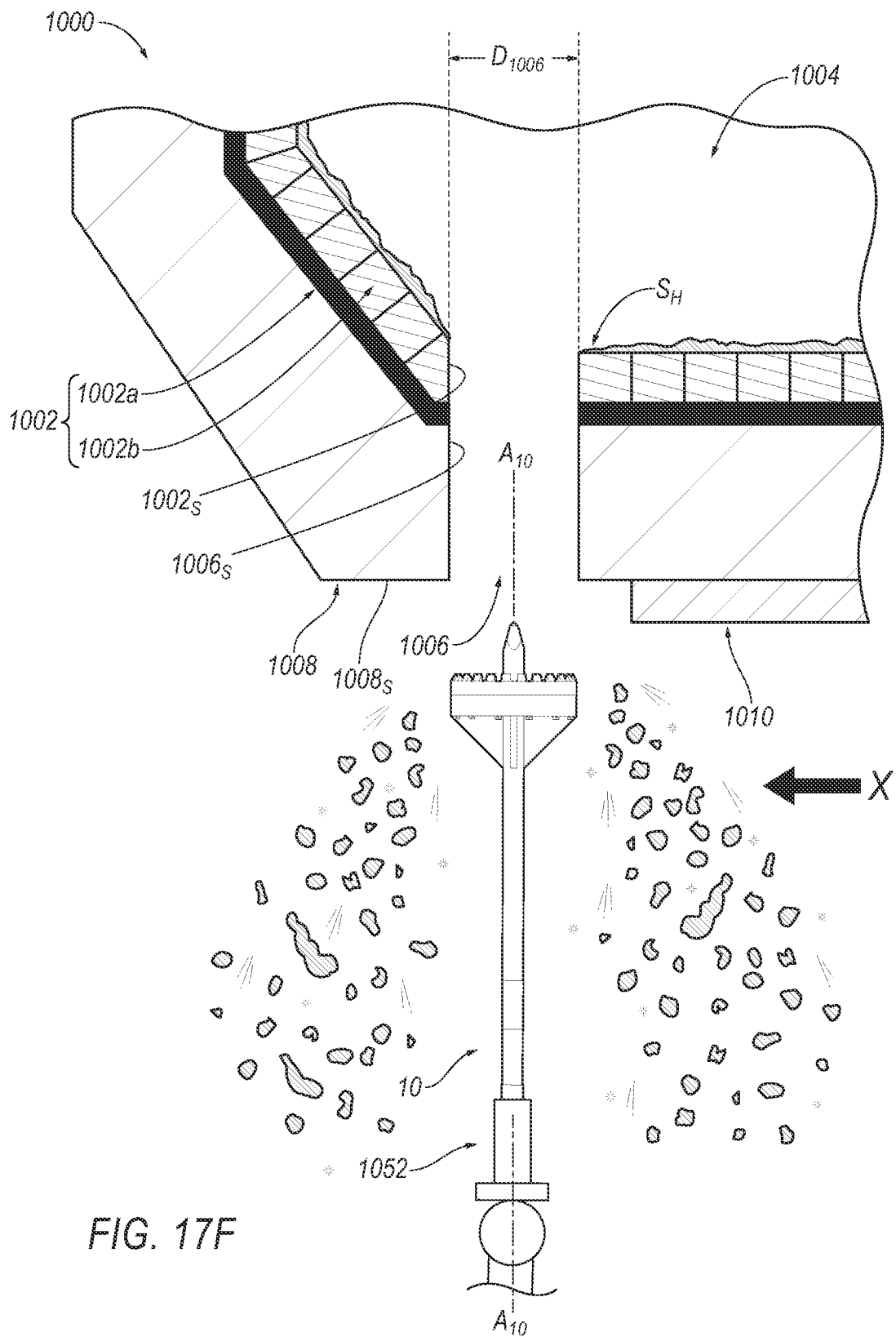
FIG. 17F is a further view according to FIG. 17E whereby the portion of the moving device is shown axially removing the material grinding end effector from the taphole of the material processing device as a result of the obstruction being removed from the taphole.

Referring to FIG. 17F, after the cutting device 10 separates and removes the hardened steel residue $S_H$ from the taphole 1006, the motor of one of the moving device 1050 or the arm portion 1052 may be de-actuated in order to cease movement Z/Z' and/or R/R' of the shaft 12. Thereafter, the arm portion 1052 may be axially withdrawn from the taphole 1006 by the arm portion 1052, thereby revealing an approximately unobstructed taphole 1006 that may be generally cleared of hardened steel residue $S_H$. As a result, melted and hot liquid steel may freely axially flow through the taphole 1006. Furthermore, as seen at FIGS. 17A-17B, the cutting device 10 may also cause the hardened steel residue $S_H$ to separate and be removed from the bottom body portion 1008 of the EAF 1000 such that the stopper gate 1010 may be permitted to move from the open orientation to the closed orientation for selectively sealing or selectively closing the taphole 1006.

In the event that the cutting device 10 is utilized for conducting a plurality of maintenance operations on a taphole 1006 as described above, the teeth 32, 84, 124 of the cutting device 10 may be worn down or dulled. While the surfaces of the teeth 32, 84, 124 of the cutting device 10 could be periodically sharpened in a machining operation in order to remove any dullness thereof, the use of the fasteners 50, 96 promote modularity of the cutting device 10 such that, for example, at least the radial teeth 84, 124 could be selectively replaced the radial cutting element 44 that includes the radial teeth 84 from the radial base element 42; and the circumferential cutting element 90 that includes the circumferential teeth 124 from the circumferential base element 88.

Although the tooth 32 is not shown or described to be modular, the tooth 32 of the shaft 12 could, in some configurations, be designed to have modularity. For example, the first portion $L_{12-1}$ of the length $L_{12}$ of the shaft 12 may form an "central toothed portion" that may include, for example, an axial fastener that is selectively removably arranged within an axial female recess of the body 20 of the shaft 12 in order to permit removable selective attachment of the first portion $L_{12-1}$ of the length $L_{12}$ of the shaft 12 that defines the central toothed portion 32 to the body 20 of the shaft 12.

In yet other configurations, the teeth 32, 84, 124 of the cutting device 10 may be defined to have unique geometries or shapes. For example, the central toothed portion 32 may be defined to have a "large" geometry that is greater than a "medium" geometry of the radial teeth 84 from the radial base element 42. Furthermore, the "medium" geometry of the radial teeth 84 from the radial base element 42 may be greater than a "small" geometry (that may be generally defined by the radial length $L_{90}$ of the circumferential cutting element 90 extending between the outer side surface 118 and the inner side surface 120 of the body 112 of the circumferential cutting element 90. Accordingly, in view the "small," "medium," and "large" tooth geometries, the teeth 32, 84, 124 may be configured to conduct specific material breaking and grinding functions.

For example, the "large" tooth 32 may be configured to break or free the hardened steel residue $S_H$ from the taphole 1006 for reduction into medium-sized or larger-sized pieces of hardened steel residue $S_H$ whereas the medium radial teeth 84 and the smaller circumferential teeth 124 are configured to further break or free the hardened steel residue $S_H$ from the taphole 1006 for reduction into medium-sized or smaller sized pieces for evacuation of the hardened steel residue $S_H$ through the head portion 14, 16, 18 of the cutting device 10 as described above.

A number of implementations have been described. Nevertheless, it will be understood that various modifications may be made without departing from the spirit and scope of the disclosure. Accordingly, other implementations are within the scope of the following claims.

What is claimed is:

1. A cutting device comprising:
   a shaft extending from a first end to a second end;
   two or more gussets including at least a first gusset and a second gusset each extending radially away from the shaft and including an axially-extending surface and a radially-extending surface;
   a circumferential cutting member axially supported by each of the first gusset and the second gusset; and
   two or more radial cut embers each (i) supported by the radially-extending surface of one of the gussets and (ii) including a plurality of radial teeth arranged in series along a radial direction extending from the shaft to the circumferential cutting member.

2. The cutting device of claim 1, wherein each radial cutting member includes:
   a radial base element; and
   a radial cutting element removably-attached to the radial base element.

3. The cutting device of claim 2, wherein each radial cutting member further includes:
   at least one fastener that extends through a fastener passage of the radial cutting element and a fastener passage of the radial base element for removably-attaching the radial cutting element to the radial base element.

4. The cutting device of claim 2, wherein the radial base element of each of the radial cutting members is fixedly attached to the one of the gussets.

5. The cutting device of claim 2, wherein the radial cutting element includes one or more teeth each including a radial inwardly-facing surface and a radial outwardly-facing surface that converge to form an apex of each tooth.

6. The cutting device of claim 1, wherein the circumferential cutting member includes:
   a circumferential base element; and
   a circumferential cutting element removably-attached to the circumferential base element.

7. The cutting device of claim 6, wherein the circumferential cutting member further includes:
   at least one fastener that extends through a fastener passage of the circumferential base element and a fastener passage of the circumferential cutting element for removably-attaching the circumferential cutting element to the circumferential base element.

8. The cutting device of claim 6, wherein the circumferential base element is fixedly attached to each of the first gusset and the second gusset.

9. The cutting device of claim 6, wherein the circumferential cutting element includes one or more circumferential teeth each including a radially inwardly-facing surface and a radially outwardly-facing surface that converge along an axial direction.

10. The cutting device of claim 1, wherein the shaft includes a central tooth extending from the second end of the shaft.

11. The cutting device of claim 10, wherein the central tooth is formed by a surface portion including one or more substantially flat surface portions and one or more fluted surface portions.

12. The cutting device of claim 11, wherein the one or more substantially flat surface portions includes a first substantially flat surface portion and a second substantially flat surface portion that is arranged in an opposing relationship with respect to the first substantially flat surface portion to form a first tooth angle, and wherein the one or more fluted surface portions includes a first fluted surface portion and a second fluted surface portion that is arranged in an opposing relationship with respect to the first fluted surface portion to form a second tooth angle, wherein the first tooth angle is greater than the second tooth angle.

13. The cutting device of claim 1, wherein the shaft includes an arm keying surface portion located near the first end of the shaft.

14. A cutting device comprising:
a shaft;
two or more gussets extending radially away from the shaft and each defining an axially-extending support surface and a radially-extending support surface;
a circumferential cutting member including a series of circumferential teeth surrounding the shaft and removably attached to each of the radially-extending support surfaces of the two or more gussets; and
a plurality of radial cutting members each including a series of radial teeth extending continuously along a radial direction between the shaft and the circumferential cutting member and removably attached to one of the radially-extending support surfaces of the two or more gussets between the shaft and the circumferential cutting member.

15. The cutting device of claim 14, wherein each of the plurality of radial cutting members includes:
a radial base element; and
a radial cutting element including the series of radial teeth removably-attached to the radial base element.

16. The cutting device of claim 15, wherein each radial cutting member further includes:
at least one fastener that extends through a fastener passage of the radial cutting element and a fastener passage of the radial base element for removably-attaching the radial cutting element to the radial base element.

17. The cutting device of claim 15, wherein the radial base element is fixedly attached to each gusset of the two or more gussets.

18. The cutting device of claim 14, wherein the circumferential cutting member includes:
a circumferential base element; and
a circumferential cutting element including the circumferential teeth removably-attached to the circumferential base element.

19. The cutting device of claim 18, wherein the circumferential cutting member further includes:
at least one fastener that extends through a fastener passage of the circumferential base element and a fastener passage of the circumferential cutting element for removably-attaching the circumferential cutting element to the circumferential base element.

20. The cutting device of claim 19, wherein the circumferential base element is fixedly attached to the radially-extending support surface of each gusset of the two or more gussets.

* * * * *